United States Patent
Arya et al.

(10) Patent No.: US 10,984,434 B1
(45) Date of Patent: Apr. 20, 2021

(54) SYSTEMS AND METHODS FOR DETERMINING AND PROVIDING NON-FINANCIAL BENEFITS ON A SUBSCRIPTION BASIS

(71) Applicant: Wells Fargo Bank, N.A., San Francisco, CA (US)

(72) Inventors: Amit Arya, San Francisco, CA (US); Christie N. Green, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 16/460,605

(22) Filed: Jul. 2, 2019

(51) Int. Cl.
G06Q 30/00 (2012.01)
G06Q 30/02 (2012.01)
G06Q 20/10 (2012.01)
G06Q 40/02 (2012.01)

(52) U.S. Cl.
CPC ....... *G06Q 30/0215* (2013.01); *G06Q 20/102* (2013.01); *G06Q 30/0224* (2013.01); *G06Q 30/0234* (2013.01); *G06Q 40/02* (2013.01)

(58) Field of Classification Search
None
See application file for complete search history.

(56) References Cited

U.S. PATENT DOCUMENTS

| 5,920,848 | A | 7/1999 | Schutzer et al. |
| 6,349,290 | B1 | 2/2002 | Horowitz et al. |
| 7,593,895 | B2 | 9/2009 | Belyi |
| 7,668,776 | B1 | 2/2010 | Ahles |
| 7,873,566 | B1 | 1/2011 | Thempleton et al. |
| 8,473,380 | B2 | 6/2013 | Thomas et al. |
| 8,489,477 | B2 * | 7/2013 | Rentala .................. G06Q 40/02 705/35 |
| 8,566,197 | B2 | 10/2013 | Satyavolu et al. |
| 8,650,105 | B2 | 2/2014 | Satyavolu et al. |
| 8,738,429 | B2 * | 5/2014 | Shepard ............. G06Q 30/0217 705/14.1 |
| 8,875,990 | B2 | 11/2014 | Bishop et al. |
| 9,477,988 | B2 | 10/2016 | Haggerty et al. |

(Continued)

OTHER PUBLICATIONS

STIC EIC 3600 Search Report for application 16460605 dated Aug. 26, 2020 (Year: 2020).*

(Continued)

*Primary Examiner* — Matthew T Sittner
(74) *Attorney, Agent, or Firm* — Foley & Lardner LLP

(57) ABSTRACT

Systems and methods relate to providing subscription accounts. A method includes receiving a request from a customer to open a subscription account, creating the subscription account for the customer, and deducting a subscription fee from the subscription account. The method also includes determining a benefit for the customer. The benefit is offered by a third-party vendor in exchange for a benefit fee. The method further includes reimbursing the benefit fee to the subscription account for the customer. The method additionally includes gathering financial information associated with the customer, analyzing the financial information to identify positive financial behavior of the customer, determining that the positive financial behavior meets a threshold, and offering the customer a reward based on the positive financial behavior meeting the threshold.

23 Claims, 14 Drawing Sheets

(56) References Cited

U.S. PATENT DOCUMENTS

| | | | |
|---|---|---|---|
| 9,558,502 B2 | 1/2017 | Carlson et al. | |
| 9,679,299 B2 | 6/2017 | Yoder et al. | |
| 9,691,086 B1* | 6/2017 | Deodhar | G06F 16/9577 |
| 9,727,818 B1* | 8/2017 | Liu | G06F 16/9535 |
| 9,741,000 B2* | 8/2017 | Kwan | G06Q 10/063118 |
| 9,767,489 B1* | 9/2017 | Liu | G06Q 30/0277 |
| 9,818,118 B2 | 11/2017 | Barrett et al. | |
| 9,825,953 B2 | 11/2017 | Gibbons | |
| 9,870,577 B1* | 1/2018 | Yang | G06Q 30/0275 |
| 9,898,779 B2 | 2/2018 | Haggerty et al. | |
| 9,909,879 B2 | 3/2018 | Vonderheide et al. | |
| 9,947,020 B2 | 4/2018 | Fordyce et al. | |
| 10,019,757 B2 | 7/2018 | Choudhuri et al. | |
| 10,055,732 B1 | 8/2018 | Hecht et al. | |
| 10,083,483 B2 | 9/2018 | Bhakta et al. | |
| 10,089,630 B2 | 10/2018 | Clyne | |
| 10,122,815 B1* | 11/2018 | Stroebel | H04L 67/2809 |
| 10,127,505 B1* | 11/2018 | Hashim | G06F 16/951 |
| 10,129,126 B2 | 11/2018 | Dintenfass et al. | |
| 10,169,756 B1 | 1/2019 | Ellis et al. | |
| 10,178,101 B2 | 1/2019 | Dintenfass et al. | |
| 10,482,462 B1* | 11/2019 | Eidam | G06Q 20/1085 |
| 2004/0049425 A1* | 3/2004 | Bakker | G06Q 20/387 |
| | | | 705/14.3 |
| 2004/0088216 A1 | 5/2004 | Bangalore | G06Q 40/02 |
| | | | 705/14.23 |
| 2004/0172310 A1* | 9/2004 | Atlee | G06Q 50/24 |
| | | | 705/4 |
| 2005/0071225 A1* | 3/2005 | Bortolin | G06Q 30/0235 |
| | | | 705/14.35 |
| 2005/0071238 A1* | 3/2005 | Guillot | G06Q 30/02 |
| | | | 705/26.1 |
| 2005/0240432 A1* | 10/2005 | Jensen | G06Q 20/10 |
| | | | 705/39 |
| 2006/0015404 A1* | 1/2006 | Tran | G06Q 30/00 |
| | | | 705/14.25 |
| 2006/0091203 A1* | 5/2006 | Bakker | G07G 1/14 |
| | | | 235/381 |
| 2006/0161474 A1* | 7/2006 | Diamond | G06Q 30/0238 |
| | | | 705/14.38 |
| 2006/0173749 A1* | 8/2006 | Ward | G06Q 30/0633 |
| | | | 705/26.8 |
| 2007/0294056 A1* | 12/2007 | Maskall | G06Q 10/00 |
| | | | 702/186 |
| 2009/0094170 A1 | 4/2009 | Mohn | |
| 2009/0138964 A1 | 5/2009 | Headings et al. | |
| 2009/0193453 A1* | 7/2009 | Cansler | H04N 21/812 |
| | | | 725/32 |
| 2010/0010887 A1* | 1/2010 | Karlin | G06Q 30/0213 |
| | | | 705/14.15 |
| 2010/0088246 A1* | 4/2010 | Lim | G06Q 30/0601 |
| | | | 705/319 |
| 2010/0106582 A1* | 4/2010 | Etheredge | G06Q 40/02 |
| | | | 705/14.17 |
| 2010/0262476 A1* | 10/2010 | Amour | G07F 17/32 |
| | | | 705/14.14 |
| 2010/0274601 A1* | 10/2010 | Bagwell | G06Q 10/087 |
| | | | 705/7.29 |
| 2010/0280935 A1 | 11/2010 | Fellowes et al. | |
| 2011/0060629 A1* | 3/2011 | Yoder | G06Q 20/10 |
| | | | 705/14.1 |
| 2011/0119130 A1* | 5/2011 | Agan | G06Q 30/02 |
| | | | 705/14.49 |
| 2011/0320294 A1 | 12/2011 | Votaw et al. | |
| 2012/0245988 A1* | 9/2012 | Pace | G06Q 30/0283 |
| | | | 705/14.25 |
| 2012/0259752 A1 | 10/2012 | Agee | |
| 2013/0030888 A1* | 1/2013 | Calman | G06Q 30/02 |
| | | | 705/14.14 |
| 2013/0103486 A1* | 4/2013 | Hess | G06Q 30/02 |
| | | | 705/14.38 |
| 2013/0204703 A1* | 8/2013 | Carlson | G06Q 30/0214 |
| | | | 705/14.56 |
| 2014/0074568 A1* | 3/2014 | Moscoe | H04L 51/28 |
| | | | 705/14.3 |
| 2014/0132623 A1* | 5/2014 | Holten | G06T 11/206 |
| | | | 345/593 |
| 2014/0164223 A1* | 6/2014 | Grigg | G06Q 30/06 |
| | | | 705/39 |
| 2014/0164224 A1* | 6/2014 | Grigg | G06Q 40/02 |
| | | | 705/39 |
| 2014/0214615 A1* | 7/2014 | Greystoke | G06Q 30/0619 |
| | | | 705/26.44 |
| 2014/0310159 A1* | 10/2014 | Zoldi | G06Q 30/02 |
| | | | 705/39 |
| 2014/0351374 A1* | 11/2014 | Canoy | H04L 67/10 |
| | | | 709/217 |
| 2014/0364201 A1* | 12/2014 | Tanibuchi | A63F 13/58 |
| | | | 463/25 |
| 2015/0032521 A1 | 1/2015 | Calman et al. | |
| 2015/0046241 A1 | 2/2015 | Salmon et al. | |
| 2015/0095216 A1* | 4/2015 | Van Heerden | G06Q 30/00 |
| | | | 705/39 |
| 2016/0307466 A1 | 10/2016 | Gioacchini et al. | |
| 2017/0083930 A1 | 3/2017 | Nagaraj et al. | |
| 2017/0124541 A1 | 5/2017 | Aggarwal et al. | |
| 2017/0178174 A1* | 6/2017 | Mitchell | G06Q 30/0233 |
| 2017/0193566 A1* | 7/2017 | Lucash | G06F 3/0485 |
| 2017/0364918 A1 | 12/2017 | Malhotra et al. | |
| 2018/0040072 A1 | 2/2018 | Dintenfass et al. | |
| 2018/0103086 A1 | 4/2018 | Jones-McFadden et al. | |
| 2018/0157725 A1* | 6/2018 | Flynn | G06F 16/2471 |
| 2018/0225678 A1 | 8/2018 | MacIlwaine et al. | |
| 2019/0200061 A1* | 6/2019 | Craig | H04N 21/2547 |

OTHER PUBLICATIONS

"Meed Banking Club—About Us", https://meedbankingclub.com/about-us, 5 pages. Accessed Jul. 2, 2019.

"Meed Launching in U.S. In December To Disrupt Mobile Banking", Payment Week, https://paymentweek.com/2018-9-11-meed-launching-u-s-december-disrupt-mobile-banking/, Sep. 11, 2018. 11 pages.

Vilar, Henry; "Meed Banking Club launches in the US with member exclusives", https://www.bankingtech.com/suthor/vilarh/, Apr. 26, 2019. 4 pages.

* cited by examiner

SYSTEMS AND METHODS FOR DETERMINING AND PROVIDING NON-FINANCIAL BENEFITS ON A SUBSCRIPTION BASIS

TECHNICAL FIELD

Embodiments of the present disclosure related generally to subscription-based benefits.

BACKGROUND

Providers offer financial accounts to various customers, such as depository accounts (including but not limited to checking, savings, certificates of deposit) and credit accounts. Customers can use these financial accounts to make purchases, such as by debit card or credit card, by check, by online transfer, or by wire transfer. Providers of financial accounts often also offer financial services, such as peer-to-peer transfers, bill pay, and spending reports, to customers associated with these financial accounts. In exchange, customers are often required to meet certain criteria, such as maintaining a minimum account balance with the provider of the account or paying a monthly account fee if the customer does not maintain the minimum account balance.

SUMMARY

One embodiment relates to a method. The method includes receiving, by a provider computing system, a request from a customer to open a subscription account; creating, by the provider computing system, the subscription account for the customer; and deducting, by the provider computing system, a subscription fee from the subscription account. The method also includes determining, by the provider computing system, a benefit for the customer. The benefit is offered by a third-party vendor in exchange for a benefit fee. The method further includes reimbursing, by the provider computing system, the benefit fee to the subscription account for the customer. The method additionally includes gathering, by the provider computing system, financial information associated with the customer; analyzing, by the provider computing system, the financial information to identify positive financial behavior of the customer; determining, by the provider computing system, that the positive financial behavior meets a threshold; and offering, by the provider computing system, the customer a reward based on the positive financial behavior meeting the threshold.

Another embodiment relates to a system. The system includes a network interface configured to communicate, via a network, with a customer device associated with a customer and a processing circuit. The processing circuit includes a memory and at least one processor. The memory stores instructions that are executable by the at least one processor to receive, from the customer device, a request from the customer to open a subscription account, create the subscription account for the customer, and deduct a subscription fee from the subscription account. The instructions are also executable by the at least one processor to determine a benefit for the customer. The benefit is offered by a third-party vendor in exchange for a benefit fee. The instructions are further executable by the at least one processor to reimburse the benefit fee to the subscription account for the customer. The instructions are additionally executable by the at least one processor to gather financial information associated with the customer, analyze the financial information to identify positive financial behavior of the customer, determine that the positive financial behavior meets a threshold, and offer the customer a reward based on the positive financial behavior meeting the threshold.

Another embodiment relates to a method. The method includes receiving, by a provider computing system, a request from a customer to open a subscription account; creating, by the provider computing system, the subscription account for the customer; and deducting, by the provider computing system, a subscription fee from the subscription account. The method also includes determining, by the provider computing system, a benefit for the customer. The benefit is offered by a third-party vendor in exchange for a benefit fee. Determining the benefit for the customer includes interfacing, by the provider computing system, with a vendor computing system associated with the third-party vendor and determining, by the provider computing system, based on the interfacing, that the customer already has an account with the third-party vendor associated with the benefit. The method further includes reimbursing, by the provider computing system, the benefit fee to the subscription account for the customer. The method additionally includes gathering, by the provider computing system, financial information associated with the customer; analyzing, by the provider computing system, the financial information to identify positive financial behavior of the customer; determining, by the provider computing system, that the positive financial behavior meets a threshold; and offering, by the provider computing system, the customer a reward based on the positive financial behavior meeting the threshold.

DETAILED DESCRIPTION

Figure 1:
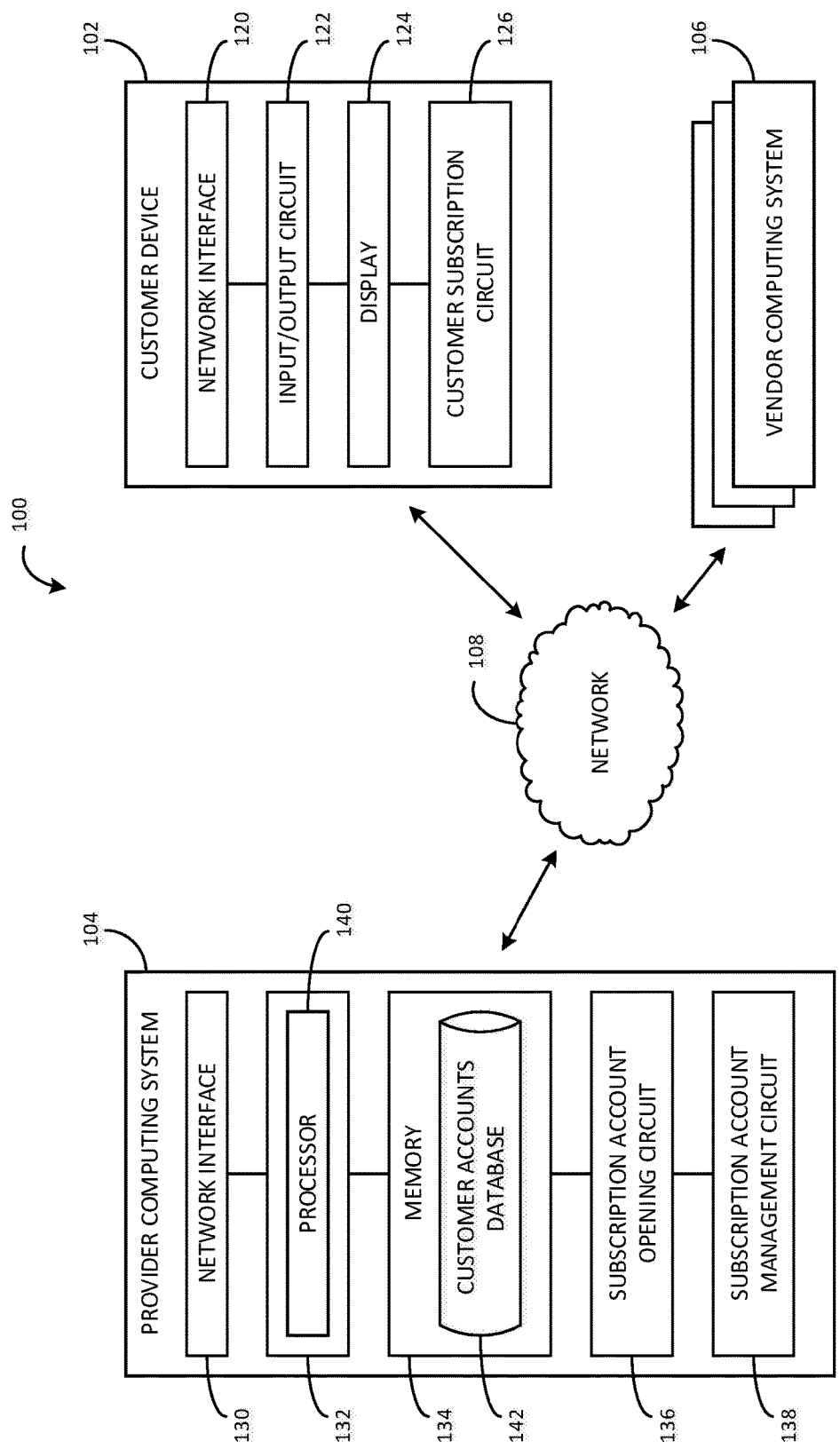
FIG. 1 is a block diagram of a system for providing subscription accounts, according to an exemplary embodiment.

Referring to the figures, various systems, methods, and apparatuses for subscription-based banking accounts are described herein. An example implementation may be described as follows. A customer holds an account (e.g., a demand deposit account) with an accounts provider, and the customer signs up for a subscription account with the accounts provider. Alternatively, a customer opens a new subscription account with the accounts provider. The subscription-based benefits for the subscription account may include, for example, recommendations and automatic actions to increase savings, recommendations for saving for large financial purchases, credits or reimbursements to cover certain outside benefits paid for by the customer, and social benchmarking that allows the customer to compare spending and savings habits to other customers like them. In exchange for the subscription-based benefits, the accounts provider deducts a monthly fee from a balance held in the subscription account.

The systems, methods, and apparatuses for subscription accounts provide advantages over the prior art. To begin with, conventional banking systems may provide some customizable benefits to the customer (e.g., personalization of a payment card related to the customer's account), but these customizable benefits are often limited and directly tied to the services provided by the banking system to the customer. By contrast, the present systems and methods for subscription accounts allow the customer to tailor the benefits provided by the customer's subscription account, which allows for a highly personalized experience tailored to fit the customer's lifestyle. Additionally, in some embodiments, the customer can select the types of benefits the customer receives from the subscription account, which may be outside benefits not directly tied to the customer's subscription account (e.g., reimbursements for rideshare services that the customer uses). As such, the subscription account allows the customer to adopt digital services matching the customer's digital habits. Customers are more likely to spend more money when the experienced is personalized, and customers may become frustrated when content is not personalized. As such, more personalization leads to higher engagement and more interaction with financial services offered by an accounts provider.

The subscription account may also provide benefits to the customer that support financial discipline, such as providing financial benchmarking reports to the customer comparing the customer's financial habits to the customer's peers and recommending ways the customer can increase savings. All this, in turn, supports higher engagement from customers with the accounts provider providing the subscription account. Additionally, the convenience of these subscription benefits, combined with the growing popularity of subscription-based products and services, may encourage customers to spend more money on financial services and keep more money in accounts with the accounts provider, thereby increasing revenue. Moreover, the benefits associated with the subscription account may be less expensive to the accounts provider than traditional advertising, particularly for affluent or high-net customers, such that the subscription accounts provide new customers and increase retention for current customers at a more affordable cost to the accounts provider.

Additionally, in various embodiments, the subscription accounts are provided as online-only accounts. In other words, the subscription accounts are only available to customers that open and use the subscription accounts online. As such, the subscription accounts reduce costs and steps required to open and manage accounts (e.g., due to the decreased need for bank employees to help customers open and manage accounts). Further, with the subscription account being provided entirely online, the benefits associated with the account are centralized in one location, such as an online banking portal or a mobile banking application. This allows the customer to more easily view and experience the benefits associated with the customer's account. In addition, providing the benefits in this centralized location may be more efficient from a computing standpoint such that computing systems, such as banking servers, associated with the accounts provider may be more optimized as part of providing these services to the customer holding a subscription account. Additionally, by improving customer satisfaction and the overall experience with holding accounts with the accounts provider, customers may be less likely to send complaints to the accounts provider or otherwise attempt to contact the accounts provider. As such, the bandwidth and processing abilities of the computing systems associated with the accounts provider may be freed for other activities because of the decreased load for responding to customer complaints.

In various embodiments, as noted above, subscription accounts described herein may be associated with providing outside benefits not directly tied to traditional banking services. For example, a subscription account may reimburse the customer for all or a percentage of a ridesharing service, a video streaming service, a music streaming service, a meal delivery kit, and so on. As such, the subscription accounts described herein may be more desirable for customers, as these benefits may be more unique and customizable compared to existing services provided by other accounts providers, including other accounts providers providing subscription-based services. As an illustration, a different accounts provider may offer banking services in exchange for a monthly fee. However, these services may be primarily tied to traditional services offered by accounts providers, such as peer-to-peer transfers, bill pay, and savings features. By contrast, the systems and methods described herein may include traditional banking services along with non-traditional banking services, such as non-banking benefits and rewards for positive financial behavior. In this way, the subscription accounts described herein are designed to increase customer engagement and retention for reasons beyond providing traditional banking services.

Referring now to FIG. 1, a system 100 for subscription accounts is shown, according to an example embodiment. The system 100 includes a customer device 102, a provider computing system 104, and one or more third-party vendor computing systems 106 connected by a secure network (e.g., network 108). In some embodiments, the network 108 includes the Internet. In other embodiments or combinations, the network 108 includes a local area network or a wide area network. The network 108 may be facilitated by short and/or long range communication technologies including Bluetooth transceivers, Bluetooth beacons, radiofrequency identification ("RFID") transceivers, near-field communication ("NFC") transceivers, Wi-Fi transceivers, cellular transceivers, wired network connections, etc. The components are configured to interact, in various arrangements, as described in further detail below.

The customer device 102 is a computing device associated with a customer of the accounts provider, where the accounts provider is associated with or operates the provider computing system 104. In some arrangements, the customer holds one or more existing accounts with the accounts provider, where at least one of the customer's accounts is capable of being used as a subscription account. In other arrangements, the customer opens a new subscription account with the accounts provider, as described in further detail below. The customer device 102 includes any type of computing device operated by a customer in connection with benefits and services provided by a provider. For example, in various embodiments, the customer device 102 is a phone (e.g., a smartphone), a mobile computing device (e.g., a tablet computer, a laptop computer, a personal digital assistant, a portable gaming device), a stationary computing device (e.g., a desktop computer, an ATM), or a wearable computing device (e.g., a smart watch, smart glasses, a smart bracelet).

As shown in FIG. 1, the customer device 102 includes a network interface 120, an input/output circuit 122, a display 124, and a customer subscription circuit 126. The network interface 120 is configured to facilitate connection of the customer device 102 to the network 108. As such, using the network interface 120, the customer may communicate with other systems or devices in the system 100, such as the provider computing system 104. Data passing through the network interface 120 may be encrypted such that the network interface 120 is a secure communication module.

The input/output circuit 122 is structured to receive communications from the customer and provide communications to the customer associated with the customer device 102. In this regard, the input/output circuit 122 is structured to exchange data, communications, instructions, etc. with input/output components of the customer device 102. Accordingly, in some embodiments, the input/output circuit 122 includes an input/output device (e.g., the display 124 or a keyboard). In other embodiments, the input/output circuit 122 includes communication circuitry for facilitating the exchange of data, values, messages, and the like between an input/output device and the components of the customer device 102. In other embodiments, the input/output circuit 122 includes machine-readable media for facilitating the exchange of information between an input/output device and components of the customer device 102. In still other embodiments, the input/output circuit 122 includes any of a combination of hardware components, communication circuitry, and machine-readable media.

The display 124 is a device used to display information in the form of text, images, video, and so on to the customer. For example, the display 124 is a screen, a touchscreen, or a monitor. In some arrangements, the customer device 102 uses the display 124 to communicate information to the customer (e.g., by displaying the information to the customer on the display 124). In certain arrangements, the customer device 102 additionally uses the display 124 to receive communications from the customer (e.g., through a keyboard provided on a touchscreen of the display 124).

The customer subscription circuit 126 is configured to facilitate the customer in opening and managing a subscription account with the accounts provider associated with the provider computing system 104. As such, the customer subscription circuit 126 is configured to communicate with the provider computing system 104 (e.g., via the network interface 120). In some arrangements, the customer subscription circuit 126 may be implemented as a specialized application (e.g., a mobile banking application) or a generic application (e.g., an email application, a text messaging or SMS application) operating on the customer device 102. As an example, the customer may access the application (e.g., by logging into the application using login credentials) and manage the subscription account using the application. In other arrangements, the customer subscription circuit 126 may be implemented as a web browser operating on the customer device 102. For example, the customer may log into an online banking portal and manage the subscription account via the portal. The customer subscription circuit 126 may also be implemented as a combination of one or more applications and/or a web browser.

As noted above, the customer subscription circuit 126 is configured to facilitate the customer in opening a subscription account with the accounts provider associated with the provider computing system 104. The subscription account may be, for example, a savings account, a checking account, or a credit account. The subscription account may further have an associated payment card, such as a debit card or a credit card depending on the account. In some embodiments, the customer holds an existing account with the accounts provider, and the customer requests to convert the account to a subscription account using the customer subscription circuit 126. In other embodiments, the customer opens a new subscription account with the accounts provider using the customer subscription circuit 126. Additionally, the customer subscription circuit 126 is configured to allow the customer to manage the subscription account and access benefits associated with the account, as described in greater detail below.

The provider computing system 104 is associated with and operated by an accounts provider (e.g., provider of demand deposit accounts, credit card accounts, etc.). Various customers, including the customer associated with the customer device 102, hold one or more accounts with the accounts provider. In the context of the present disclosure, the accounts provider can include financial institutions, such as commercial banks, credits unions, investment brokerages, mobile wallet providers, and so on.

As shown in FIG. 1, the provider computing system 104 includes a network interface 130, a processing circuit 132, a memory 134, a subscription account opening circuit 136, and a subscription account management circuit 138. The network interface 130 is configured to facilitate connection of the provider computing system 104 to the network 108. As such, using the network interface 130, the provider computing system 104 may communicate with other subsystems or devices in the system 100, such as the customer device 102 and the one or more vendor computing systems 106. Data passing through the network interface 130 may be encrypted such that the network interface 130 is a secure communication module.

The processing circuit 132 includes a processor 140. As shown in FIG. 1, the processing circuit 132 is also operably connected to the memory 134. As further shown in FIG. 1, the memory 134 includes a customer accounts database 142. The customer accounts database 142 is structured to retrievably store information for various customers holding accounts with the accounts provider. For example, the customer accounts database 142 may store biographical information about various customers (e.g., names, addresses, birthdays, emails, phone numbers, etc.), account information for various customers (e.g., account balances, account histories, account preferences, subscription benefit selections, etc.), template or reference access credentials for accounts (e.g., passwords, personal identification numbers ("PINs"), biometrics, etc.), and the like.

The subscription account opening circuit 136 is configured to create the subscription accounts held by various customers of the accounts provider. As an illustration, in response to a request from an existing or potential customer, the subscription account opening circuit 136 is configured to open a subscription account for the customer (e.g., based on a request submitted by the customer device 102). In some arrangements, the subscription account opening circuit 136 is configured to receive a request to convert an existing account into a subscription account. For example, the subscription account opening circuit 136 may determine that an existing customer is eligible to convert an existing account to a subscription account (e.g., based on the customer's financial history). As such, the subscription account opening circuit 136 may send the customer a notification via an email, a phone call, a banner on an online banking portal, a mailer (e.g., by placing the customer onto a mailing list), and so on indicating that an existing account held by the customer is eligible to be converted into a subscription account. Subsequently, the subscription account opening circuit 136 may receive a request from the customer (e.g., via the customer device 102) to convert the existing account into a subscription account. Alternative or additionally, in some arrangements, the subscription account management circuit 138 is configured to receive a request to open a new subscription account for a new or existing customer.

In some embodiments, the subscription account opening circuit 136 is configured to create the subscription account (e.g., by automatically converting an existing account into a subscription account or opening a new subscription account) based on existing information about the customer and/or new information requested from the customer. For example, for an existing customer, the subscription account opening circuit 136 may retrieve biographical and account information for the customer from the customer accounts database 142 and evaluate a level of risk associated with the customer (e.g., based on the customer's account history, based on a credit report pulled for the customer, etc.). By contrast, for a new customer, the subscription account opening circuit 136 may request and receive biographical information from the customer (e.g., via user interfaces sent to the customer device 102). The subscription account opening circuit 136 may then use the biographical information to evaluate a level of risk associated with the customer (e.g., by using the biographical information to pull a credit report for the customer, etc.). In response to the customer risk level being below a certain level of risk, the subscription account opening circuit 136 may convert the customer's existing account into a subscription account or open a new subscription account. Alternatively or additionally, in some embodiments, the subscription account opening circuit 136 may pre-approve the customer for the subscription account (e.g., based on a risk level determined using existing information about the customer stored in the customer accounts database 142 or another database, such as a credit report database or a marketing database).

In some embodiments, the subscription account opening circuit 136 is configured to create the subscription account after receiving a confirmation from an employee of the accounts provider. For example, the subscription account opening circuit 136 may recommend converting or opening the subscription account to an employee. The employee confirms the recommendation, in response to which the subscription account opening circuit 136 converts or opens the subscription account. In other embodiments, the subscription account opening circuit 136 is configured to convert or open the subscription account automatically without any input from employees. For example, the customer may be able to submit the request to convert or open the subscription account entirely online, and the subscription account opening circuit 136 is configured to convert or open the subscription account based on the online request. In some arrangements, this may allow the accounts provider to provide the subscription accounts more cost effectively because limited human capital is needed to open (and, in various arrangements, manage) the subscription accounts. Additionally, this may also allow the accounts provider to appeal to a younger demographic, who may prefer interacting online.

In various embodiments, the subscription account opening circuit 136 is configured to offer the customer multiple subscription tiers as part of creating a subscription account. For example, in one embodiment, the subscription account opening circuit 136 is configured to offer three tiers: a "silver" tier, a "gold" tier, and a "platinum" tier. Each tier is associated with a certain subscription amount that the customer pays for the account periodically. Referring to the previous example, the silver tier includes a $1.99 per month subscription fee (e.g., targeted to student customers, mass market customers, emerging affluent customers, and small business customers), the gold tier includes a $7.99 per month subscription fee (e.g., targeted to student customers, mass market customers, emerging affluent customers, and affluent away customers), and the platinum tier includes a $16.99 per month subscription fee (e.g., targeted to mass market customers, emerging affluent customers, and affluent away customers). Alternatively, the silver tier includes a $9.99 per month subscription fee, the gold tier includes a $14.99 per month subscription fee, and the platinum tier includes a $19.99 per month subscription fee. In other arrangements, the subscription amount is charged at different times, such as quarterly or yearly. Further, in some arrangements, the subscription amount varies depending on the period of time for which the customer subscribes at a certain time. For example, the customer may be given a discount (e.g., a 10% discount) if the customer subscribes for a quarter at once or a year at once instead of monthly. Each tier is also associated with certain types and/or amounts of subscription benefits, as discussed in further detail below. Alternatively, in some embodiments, the accounts provider may not offer subscription tiers. As such, the subscription account opening circuit 136 may create all subscription accounts with the same subscription fee and potential benefits. As in the tiered examples above, the subscription fee may be charged periodically, such as monthly, quarterly, or yearly, and in some arrangements, the subscription amount may vary depending on the period of time for which the customer subscribes at once. Once the subscription account is created for the customer, and the customer has selected a tier for the subscription account (e.g., in embodiments including subscription tiers), the subscription account management circuit 138 is configured to automatically withdraw the subscription fee amount from the balance in the subscription account periodically according to the selected tier.

The subscription account management circuit 138 is configured to facilitate the customer in managing the subscription account and in determining and providing the benefits associated with the subscription account to the customer. In some embodiments, the customer's subscription account may include features or benefits related to the financial services, such as facilitating payments and transfers, directly provided by the customer's subscription account. For example, the subscription account management circuit 138 may allow the customer a greater number of withdrawals or transfers than would normally be allowed with a comparable account, may waive a monthly service fee, may provide the customer with free checks, may allow the customer to transfer more money per month using a peer-to-peer transfer system associated with the subscription account, and so on. In some embodiments, the customer's subscription account may alternatively or additionally include features to facilitate the customer in increasing savings and budgeting. For example, the subscription-based account may automatically round up purchases made from a payment card associated with the subscription account (e.g., a debit card) and deposit the rounded-up amount to a savings account held by the customer. As another example, the subscription account management circuit 138 may automatically apply small budget deductions to be set aside for a new financial goal for the customer, such as saving up money for a down payment on a house or a car.

As another example, the subscription account management circuit 138 may analyze the customer's income, spending patterns, and savings patterns and facilitate the customer in setting and maintaining a budget. For example, the subscription account management circuit 138 may aggregate the customer's income information, spending information, and savings information for a certain time period (e.g., 90 days, six months, one year). The subscription account management circuit 138 may then analyze the aggregated income, spending, and savings information to determine the customer's habits. For instance, the subscription account management circuit 138 may determine the average amount of income the customer has per month over the time period, determine the average amount that the customer saves per month, and determine the average amount that the customer spends per month in different categories (e.g., auto/transportation, bills/utilities, business/office, cash/ATM, entertainment, food/drink, home, insurance/financial, miscellaneous, shopping, credit card/loan payments, outgoing transfers, and uncategorized payments). The subscription account management circuit 138 may then recommend a limit that to place on the customer's spending per month in each category.

In some arrangements, the subscription account management circuit 138 may recommend each limit as being the average amount that the customer spends per month in each category. In other arrangements, the subscription account management circuit 138 may recommend the limit as being less than the customer spends per month on each category. Further, in some arrangements, the subscription account management circuit 138 may analyze the customer's spending patterns and recommend a budget for the customer to increase savings. For instance, for one customer, the subscription account management circuit 138 may determine, based on the analyzed income, savings, and spending information, that the customer is spending more than the customer's income or nearly as much as the customer's income. Accordingly, the subscription account management circuit 138 may recommend that the limit for each category be less than the amount the customer currently spends per month in each category on average. In some arrangements, the subscription account management circuit 138 may further use social benchmarking data, described in further detail below, to determine where the customer may be able to cut spending based on aggregated financial information from the customer's peers. As an illustration, the subscription account management circuit 138 may determine that the customer's peers spend less than the customer on food and drink and, as such, that the customer can decrease spending on entertainment. However, for another customer, the subscription account management circuit 138 may determine, based on the analyzed income, savings, and spending information, that the customer is saving a healthy amount of income (e.g., 20% or more of the customer's income). As such, the subscription account management circuit 138 may recommend that the limit for each category be the same as the amount that the customer currently spends per month in each category on average.

In some arrangements, the subscription account management circuit 138 may take the customer's preferences into account when setting the budget limits. To illustrate, the subscription account management circuit 138 may provide a user interface to the customer (e.g., via an online banking portal or mobile wallet application on the customer device 102) whereby the customer selects the customer's interests that the customer would like the subscription account management circuit 138 to prioritize in determining recommended budget limits. The subscription account management circuit 138 receives the customer's preferences and determines the recommended budget limits to accommodate what the customer prefers. For example, if the customer indicates that the customer would like clothing to be prioritized, the subscription account management circuit 138 may set a larger shopping budget limit and accordingly decrease the budget limits in the remaining categories to accommodate the larger shopping limit.

In various arrangements, the budget limits are adjustable by the customer. For example, the subscription account management circuit 138 may recommend budget limits for the customer as described above, but the customer may modify the recommended budget limits (e.g., by entering a new amount for a budget limit, by dragging an icon representing a budget limit up or down a track, etc.). As another example, the subscription account management circuit 138 may not recommend any budget limits for the customer, and the customer may set the budget limits entirely on his or her own.

Additionally, in various arrangements, the subscription account management circuit 138 may notify the customer of spending below, at, or above the customer's budget. As an illustration, the subscription account management circuit 138 may send a notification to the customer (e.g., via an email, via a text message) halfway through the month and at the end of the month notifying the customer of the customer's spending relative to the customer's budgeting limits. In some arrangements, the frequency of these regular notifications may be set by the customer. The subscription account management circuit 138 may further notify the customer when the customer is close to meeting the customer's spending limit (e.g., when the customer is within 10% of a limit for a particular category and/or for the customer's budget overall) and when the customer has gone over the customer's spending limit (e.g., for a particular category and/or for the customer's budget overall). In some arrangements, a regular notification may be less urgent than a spending limit notification. For instance, the subscription account management circuit 138 may send mid-month and end-of-month spending notifications by email to the customer such that the customer is made aware of the notification when the customer next checks his or her email.

However, the subscription account management circuit 138 may text the customer when the customer is close to meeting the customer's spending limit or has gone over the customer's spending limit such that the customer is immediately aware of the notification.

Further, in some arrangements, the subscription account management circuit 138 may take certain savings goals for the customer into account when setting the budget limits. As an illustration, the customer may indicate that the customer would like to save enough money over the next year to purchase a car in a certain price range (e.g., $22,000 to $28,000). As such, the subscription account management circuit 138 may analyze the customer's spending information to determine where the customer could make cuts to the customer's spending and recommend limits accordingly. In some embodiments, the subscription account management circuit 138 may take social benchmarking information, described in further detail below, into account when making these determinations. To illustrate, the subscription account management circuit 138 may determine that the customer spends 18% more than the customer's peers on clothing and 24% more than the customer's peers on entertainment. Accordingly, the recommended limits for clothing may include an 18% cut on clothing spending and a 24% cut on entertainment spending for the customer. In some arrangements, if the customer successfully meets the recommended limits during a given period of time (e.g., for the month), the subscription account management circuit 138 may automatically set aside the amount that the customer saved for the customer's savings goal. As an illustration, referring to the previous example, the subscription account management circuit 138 may move the 18% saved on clothing spending and the 24% saved on entertainment spending to a savings account associated with the customer.

As another example, the subscription account management circuit 138 may display aggregated financial information for the customer on one user interface, for example, as part of an online banking portal or a mobile banking application. The aggregated financial information for the customer may include both the customer's savings habits and the customer's spending habits such that the customer is able to more easily make decisions regarding budgeting. As an illustration, the subscription account management circuit 138 may aggregate the customer's spending information and savings information for a certain time period (e.g., 60 days, 90 days, one year). In some arrangements, the customer may be able to select the time period for the aggregation. Then, the subscription account management circuit 138 may divide the customer's spending information and savings information into different categories. For instance, the subscription account management circuit 138 may divide the customer's spending information into spending on auto/transportation, bills/utilities, business/office, cash/ATM, entertainment, food/drink, home, insurance/financial, miscellaneous, shopping, credit card/loan payments, outgoing transfers, and uncategorized payments. Similarly, the subscription account management circuit 138 may divide the customer's savings information into savings in an IRA, in a 401(k), in a certificate of deposit ("CD"), in an investment account, in a savings account, and so on (e.g., depending on the savings accounts or portfolios the customer holds with the provider and/or the outside savings accounts or portfolios the customer gives the accounts provider access to). Then, the subscription account management circuit 138 may display the customer's spending and savings information as graphs or charts. For instance, the subscription account management circuit 138 may display the customer's total spending amount, the customer's total savings amount, a pie chart breaking down the customer's spending amount by category, and a pie chart breaking down the customer's savings amount by category. In some arrangements, the aggregated financial information may also include information on the budget planning for the customer, such as the budget limits and how the customer's spending compares to the budget limits, as discussed above.

In some embodiments, as another benefit of the subscription account, the subscription account management circuit 138 may provide the customer with social benchmarking that allows the customer to compare their spending habits to other customers like them. In some arrangements, the subscription account management circuit 138 aggregates financial data from various customers with subscription accounts. As an illustration, the subscription account management circuit 138 collects financial data from customers who have opted in to the financial data aggregation, who have not opted out of the financial data aggregation, who have agreed to receive social benchmarking information in exchange for opting into the financial data aggregation, and so on. The financial data may include various financial metrics, such as credit report scores, spending information, saving information, debt-to-income ratio, and so on. In some arrangements, the subscription account management circuit 138 also gathers financial information from outside account providers, for example, based on the customer providing login information for the outside account providers and the subscription account management circuit 138 retrieving the outside financial information using the login information (e.g., using screen scraping). In some arrangements, if given permission, the subscription account management circuit 138 also collects anonymous information, such as demographic information, about the customer from social media (e.g., by interfacing with the customer's social media accounts using application programming interfaces ("APIs") after given permission by the customer).

The subscription account management circuit 138 scrubs any personal identifiable information from the financial and demographic data such that the data is anonymous. The subscription account management circuit 138 then divides the financial data into categories based on the demographic information. To illustrate, the financial data may be divided into data from customers in certain age groups (e.g., less than 19, 19 to 25, 26 to 35, 36 to 45, 46 to 55, 56 to 65, and 66 and older), in certain income levels (e.g., $0 to $20,000 a year, $20,001 to $40,000 a year, $40,001 to $60,000 a year, $60,001 to $80,000 a year, $80,0001 to $100,000 a year, $100,001 to $120,000 a year, $120,001 to $140,000 a year, and above $140,000 a year), in certain geographic areas (e.g., for the United States, by state or by geographic region, such as Southwest, West, Midwest, Southeast, and Northeast), in certain life stages (e.g., single, married, with children), by gender, and so on. Next, the subscription account management circuit 138 aggregates the financial data for customers in a group most similar to the customer (e.g., a group reflecting the customer's peers in terms of gender, age, income level, and so on). In some arrangements, the subscription account management circuit 138 may use machine-based learning to refine the comparison group to better compare the customer with the customer's peers in terms of age, income, geographic area, life status, etc. For example, after the subscription account management circuit 138 determines the peer comparison group, the subscription account management circuit 138 may display characteristics of this peer comparison group to the customer and ask the customer to confirm whether these characteristics accurately represent the customer's peers. The subscription account management circuit 138 may then use the customer's feedback to further determine the comparison group for the customer in the future and/or determine comparison groups for other customers.

In some arrangements, the customer may be able to select the parameters for the data aggregation. As an illustration, the subscription account management circuit 138 may have a default aggregation shown to the customer (e.g., a combination of age group and income level that includes the customer). However, the customer may be able to select different parameters for the aggregation, such as income level and geographic level. The customer may also have the ability to make the comparison group more specific or less specific. For example, the customer may be able to select a broader or narrower age range and income range for the comparison group. Additionally, in some arrangements, the customer may be able to review aggregated data for groups that do not apply to the customer.

Based on the aggregation groups, the subscription account management circuit 138 displays the aggregated financial information to the customer, for example, as part of a user interface of an online banking portal or a mobile banking application. The aggregated financial information may be divided into different social benchmarking charts or graphs showing different types of financial information. As an illustration, a first chart may display social benchmarking savings information, a second chart may display social benchmarking expenses information, a third chart may display social benchmarking investment information, and so on. In some arrangements, the subscription account management circuit 138 may provide the customer the opportunity to view more specific social benchmarking information within each chart, such as a housing expenses chart within a social benchmarking expenses chart. The subscription account management circuit 138 is further configured to display in each chart where the customer fits into the aggregated data. The subscription account management circuit 138 may also indicate where the average customer overall and/or within the comparison group fits into the aggregated data.

In one illustration, the aggregated financial information is displayed as bar charts showing the average or median financial information for different sections of the aggregated groups. For example, the aggregated financial information for savings may be divided into sections based on the lowest 0-20% savings amounts, the next 21-40% savings amounts, the next 41-60% savings amounts, the next 61-80% savings amounts, and the next 81-100% savings amounts. The subscription account management circuit 138 may determine the average or median savings amount for each section and display the average or median savings amount in a bar chart. The subscription account management circuit 138 may indicate which section the customer falls into and which section includes the overall average or median for the aggregated financial information.

In another illustration, the aggregated financial information is additionally or alternatively displayed in tables showing the average or median financial values for the comparison group against the customer's financial values. As an example, one table may show the customer's monthly expenses, the average or monthly expenses from the comparison group, and the difference (e.g., both actual and percentage) between the customer's monthly expenses and the comparison group's monthly expenses. A second table may show the customer's monthly income, the average or monthly income from the comparison group, and the difference (e.g., both actual and percentage) between the customer's monthly include and the comparison group's monthly income.

In another illustration, the aggregated financial information is additionally or alternatively displayed in pie charts showing the average or median financial values for the comparison group against the customer's financial values. As an example, a pie chart may show the average or median expenses for the comparison group by category. The pie chart may further indicate how the customer's average or median expenses compare to the average or median expenses of the comparison group.

In some embodiments, the subscription account management circuit 138 may also provide the customer with outside benefits not directly related to banking or other financial services. As an illustration, the subscription account management circuit 138 may provide the customer with complete or partial (e.g., a percentage of) reimbursements for rideshare services, meal delivery services, music streaming services, cell phone insurance, health benefits, and so on offered by third parties. In some arrangements, the cost of the outside benefit (e.g., the benefit fee) may be equal to the subscription fee that the customer pays for the subscription account. To illustrate, the customer may have the ability to select a third-party outside service (e.g., Netflix®, Uber®, Lyft®, Pandora®, Hulu®) that the subscription account management circuit 138 reimburses the customer for or directly pays the third party for, up to the amount of the customer's monthly subscription fee. In some arrangements, if third-party service selected by the customer does not use the full amount of the monthly subscription fee, the rest of the subscription fee may be applied to a second third-party service (e.g., that the customer has designated as a secondary third-party service the customer would like to be reimbursed for). Alternatively, in some arrangements, if the third-party service selected by the customer does not use the full amount of the monthly subscription fee that the customer pays for the subscription account, the rest of the subscription fee may be credited to the customer's subscription account. As an illustration, if the customer has selected a video streaming service as the customer's outside benefit, but the customer cancels his or her subscription with the video streaming service on a given month, the subscription account management circuit 138 may credit back the customer's subscription fee and prompt the customer to select a new third-party benefit for the coming month (e.g., by sending the customer an email, by texting the customer, by displaying a pop-up notification when the customer next logs into an online banking portal or mobile banking app).

Alternatively, in some arrangements, the subscription account management circuit 138 may directly make a payment on the customer's behalf to the third-party vendor offering the outside benefit. For example, the accounts provider may negotiate a discount rate for customers of the accounts provider with one or more vendors offering one or more outside benefits (e.g., based on the bulk of customers that the accounts provider is providing to the one or more vendors). The subscription account management circuit 138 may then aggregate the benefit fees for all subscription account customers desiring the benefit(s) offered by the one or more third-party vendors and make a bulk payment to each of the one or more vendors (e.g., on a monthly basis) on behalf of the various customers of the accounts provider desiring one or more vendor's benefit(s). Further, in some arrangements, the subscription account management circuit 138 may interface with one or more vendor computing systems 106 associated with the one or more vendors (e.g., using APIs) to determine what third-party benefits a particular customer already holds with the third-party vendors. For example, the subscription account management circuit 138 may use an API to access information about a particular customer stored with a vendor at the vendor computing system 106 (e.g., with the customer's permission) to determine whether the customer has an account with the vendor. Then, the subscription account management circuit 138 may use the gathered vendor account information to directly pay the vendor on the customer's behalf.

The subscription account management circuit 138 may, in some arrangements, recommend third-party benefits for the customer to select for the customer's subscription account. For example, the subscription account management circuit 138 may use the customer's biographical information and financial history information (e.g., stored in the customer accounts database 142) to determine one or more benefits that the customer already uses and/or the customer is likely to enjoy. As an illustration, when an existing customer converts or opens a subscription account with the accounts provider, the subscription account management circuit 138 may compare the customer's biographical information and financial history information (to the extent it is available) to other customers of the accounts provider to determine one or more third-party benefits that (1) the customer already uses (e.g., based on identifying that the customer has paid for the one or more benefits in the past using the subscription account or another account held by the customer with the accounts provider) and/or (2) the customer is likely to enjoy based on benefit selections from other customers of the accounts provider (e.g., based using the customer's biographical information to identify the benefit as being selected by other customers with similar biographical information). The one or more benefits may be set as the default benefit(s) for the customer. The customer can change the default benefit, for example, by accessing a benefits menu on an online banking portal or mobile banking application associated with the subscription account. As another illustration, after receiving permission from the customer, the subscription account management circuit 138 may interface with the one or more vendor computing systems 106 (e.g., using APIs) to determine whether the customer already has an account with each of the one or more vendor computing systems 106, as described above, to recommend that the customer select a third-party benefit that the customer already uses.

In some arrangements, the subscription account management circuit 138 may provide the customer with additional services related to third-party benefits beyond, for example, a particular one or two benefits that the accounts provider reimburses the customer for or pays the third-party vendor for directly. For example, the subscription account management circuit 138 may also provide the customer with a discount (e.g., a percentage off or a certain cash value off of) purchases with certain merchants or services used with certain service providers. This percentage off may be reimbursed to the customer, paid to the vendor providing the benefit directly, or offered by the vendor as negotiated with the vendor by the accounts provider.

In some embodiments, as additional or alternative benefit, the subscription account management circuit 138 may provide rewards to customers engaging in positive financial behavior. In some arrangements, the subscription account management circuit 138 may be configured to employ machine-based learning techniques (e.g., supervised classification and regression techniques) to identify positive financial behavior out of the customer's monthly behavior. For instance, paying a mortgage payment on time and paying a credit card off in full for twelve consecutive months may be classified as positive behavior. Based on the customer's positive behavior, the subscription account management circuit 138 is configured to offer a reward to the customer. As an illustration, based on detecting that the customer has made consistent mortgage payments for a certain period of time (e.g., for six months, for a year) and that those mortgage payments have been received, the subscription account management circuit 138 may be configured to offer the customer four free ridesharing rides (e.g., by reimbursing the customer for the rides, by directing paying the ridesharing company). In some arrangements, the reward may be linked to a third-party benefit that the customer has selected to receive as part of the subscription account or otherwise indicated is important to the customer. For example, if the customer indicates he that she would like the third-party outside benefit to be a monthly reimbursement for a Netflix® account, the reward for positive financial behavior may be reimbursement for a certain number of months of Amazon Prime®. In some arrangements, the benefit for positive financial behavior may only be available to customers of the accounts provider that have one or more additional accounts with the accounts provider, such as a mortgage, a credit card, or an auto loan, such that the positive financial behavior is based on their habits regarding their one or more additional accounts.

In some embodiments, at least some of the subscription account benefits may be tied to the subscription tier selected by the customer. In one example, a first tier (e.g., a $1.99 per month or $23.88 per year silver tier) allows the customer a greater number of withdrawals/transfers per month than a non-subscription account (e.g., up to fifteen withdrawals/transfers per month), waives the monthly service fees for the subscription account, and allows the customer a greater amount of aggregate peer-to-peer transfers per month than a non-subscription account (e.g., up to $10,000 per month in peer-to-peer transfers). A second tier (e.g., a $7.99 per month or $95.88 per year gold tier) provides the customer with the benefits of the first tier along with 20% off rideshare up to a yearly aggregate (e.g., $100) when paying for the rides using the subscription account, the ability to view social benchmarking information of monthly habits of like customers (e.g., as described above), and savings recommendations for the customer. As an illustration, the subscription account management circuit 138 may illustrate to the customer how saving 3% of the customer's dining budget could add up over the course of a year. A third tier (e.g., a $16.99 per month or $203.88 per month platinum tier) provides the customer with the benefits of the first tier and the second tier along with a refund of 100% of a video streaming service or music streaming service (e.g., Netflix®, Hulu®, or Spotify®) when using the subscription account to pay for the streaming service, 10% off one meal delivery kit per month up to a monthly aggregate (e.g., $90) when using the subscription account to pay for the meal delivery kit, and health benefits (e.g., a plan through EmblemHealth®) or cell phone insurance. In some embodiments, the tiers and their associated benefits may be made available to the customer based on, for example, the customer's history with the accounts provider or a level of risk the customer represents to the accounts provider. As an illustration, a less risky customer (e.g., a customer with a risk level below a threshold) may be provided with the option to select any of the three tiers described above, but a more risky customer (e.g., a customer with a risk level above a threshold) may be provided with the option to select only the first two tiers. In some embodiments, the customer may be able to opt out of one or more undesired benefits, such as social benchmarking, associated with a given tier.

Additionally, in some embodiments, the customer may be able to select the one or more third-party outside benefits, as described above, depending on the selected tier. For example, the subscription account management circuit 138 may offer to the customer the option of selecting a video streaming service subscription account (e.g., Netflix®, Hulu®, Prime Video®) for which the customer is reimbursed by the subscription account management circuit 138 or for which the subscription account management circuit 138 automatically pays, depending on the embodiment. The customer then selects the third-party video streaming account that the customer prefers as the benefit. However, at a higher tier, the customer has the option of selecting a video streaming service subscription account and either a meal delivery kit or a music streaming service subscription account. As another example, at higher tiers, the subscription account management circuit 138 may offer to the customer the option of selecting between different savings plans that are automatically implemented by the subscription account management circuit 138.

Alternatively, in other embodiments, the subscription account may be offered at a single tier. In such embodiments, all customers with subscription accounts are able to use the same benefits associated with the subscription accounts (e.g., all of the benefits discussed above may be available to all customers with subscription accounts).

In various embodiments, the subscription accounts may be configured to be revenue neutral or revenue negative such that the cost of the benefits provided to the customer are equal to or exceed the amount of the subscription fee paid by a customer for a subscription account. Instead, the subscription account may be profitable to the accounts provider due to a combination of, for example, yearly revenue from new customers, yearly revenue from current customers (e.g., due to increased engagement with the subscription accounts), revenue from monthly deposits from customers, and incremental acquisition and retention revenue.

Additionally, in some embodiments, the subscription account may revert to a regular account if the customer cancels the subscription. For example, if the subscription account is a checking account, the account may still be used as checking account if the customer cancels the subscription, but the customer is not given access to some or all of the benefits provided under the subscription. Further, in some embodiments, the customer may be able to upgrade or downgrade the subscription account by opting to pay more or less in subscription fees for the account. As an illustration, a customer may access an account management menu on an online banking portal or mobile banking application associated with the subscription account. Using the account management menu, the customer may select to upgrade to a higher level tier or downgrade to a lower level tier by agreeing to pay more or less in subscription fees, respectively. The customer may be charged the new fee for the next calendar month, with the benefits associated with the new tier to coming into effect the next calendar month. Alternatively, the customer may immediately be refunded a portion of a paid fee or have a balance of the additional fee deducted from the customer's subscription account, with the benefits associated with the new tier coming into effect immediately.

Figure 2:
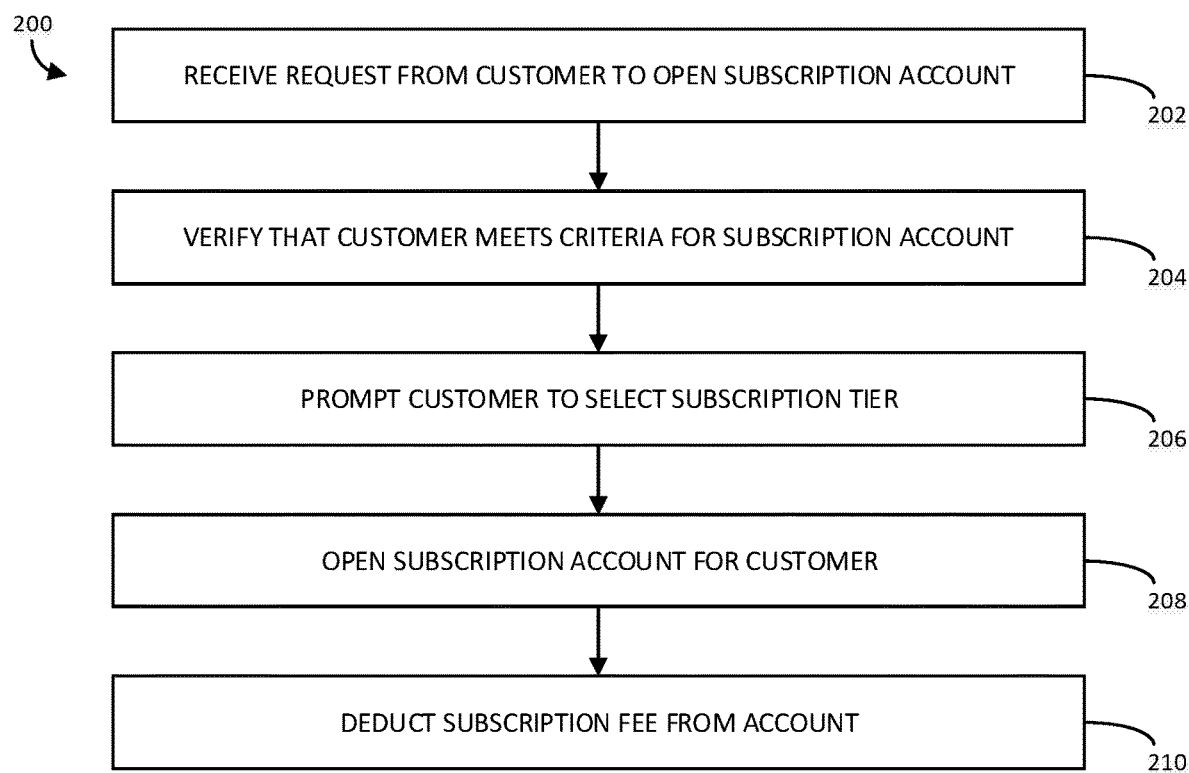
FIG. 2 is a flow diagram of a method of setting up a subscription account for a customer, according to an exemplary embodiment.

Referring now to FIG. 2, a method 200 of setting up a subscription account for a customer is shown, according to an example embodiment. At 202, the provider computing system 104 receives a request from a customer (e.g., via the customer device 102) to open a subscription account. In some embodiments, the customer is requesting to open a new account with the accounts provider. In other embodiments, the customer is requesting to convert an existing account held with the accounts provider to the subscription account. Additionally, in various embodiments, the provider computing system 104 receives the request online, such as through a website associated with the provider computing system 104 or through a mobile banking application.

At 204, the provider computing system 104 verifies that the customer meets criteria for the subscription account. For example, the criteria may include a certain level of risk that the customer meets or is below (e.g., based on the customer's credit score and financial history), a minimum balance that the customer needs to maintain in the subscription account, and so on. In some embodiments, the provider computing system 104 may offer the customer a subscription account with different terms based on whether the customer meets various account criteria thresholds. As an illustration, if a level of risk associated with the customer is at or below a first, higher threshold of risk but rises above a second, lower level of risk, the provider computing system 104 offers the customer the subscription account with a first set of terms. For example, if the subscription account is a credit account, the customer may be offered the subscription account with a first, higher interest level. As another example, if the subscription account is a debit or checking account, the customer may be offered the subscription account with a requirement that the customer maintain a first, higher minimum account balance. Alternatively, if the level of risk associated with the customer is at or below the second, lower level of risk, the provider computing system 104 offers the customer the subscription account with a second set of terms. As an example, if the subscription account is a credit account, the customer may be offered the subscription account with a second, lower interest level. As another example, if the subscription account is a debit or checking account, the customer may be offered the subscription account with a requirement that the customer maintain a second, lower minimum account balance.

At 206, the provider computing system 104 prompts the customer to select a subscription tier. In various embodiments, each subscription tier is associated with a certain subscription fee (e.g., charged on a monthly or yearly basis). For example, the provider computing system 104 may offer the customer three different subscription tiers, where the lowest tier is associated with a $1.99 per month fee, the second tier is associated with a $7.99 per month fee, and the highest tier is associated with a $14.99 per month fee. Additionally, each subscription tier is associated with certain types and/or a certain amount (e.g., a certain monetary amount and/or a certain quantity) of benefits. In some embodiments, the customer may be offered a fee discount if the customer pays for a certain amount of time for the subscription account at once, such as a 15% discount if the customer agrees to pay the entirety of a yearly subscription at once as opposed to paying the subscription fee month-to-month. Alternatively, in some embodiments, all subscription accounts may be offered at a single tier. As such, the customer may not be prompted to select a subscription tier, and the provider computing system 104 may instead proceed to opening the subscription account.

At 208, the provider computing system 104 opens a subscription account. As an illustration, if the customer has requested a new account, the provider computing system 104 opens a new subscription account for the customer and, for example, transfers a certain amount of money provided by the customer into the new subscription account. As another illustration, if the customer has requested that an existing account be converted into the subscription account, the provider computing system converts the customer's existing account in to a subscription account and rolls over the customer's existing balance into the converted subscription account. In embodiments where the customer has selected a subscription tier at 206, the new subscription account is opened with benefits depending on the tier that the customer selected.

At 210, the provider computing system 104 deducts the subscription fee from the account. For example, the provider computing system 104 deducts the subscription fee on a regular basis, such as monthly. In some embodiments, the provider computing system 104 deducts the subscription fee according to a schedule set by the customer, such as on a day of the month specified by the customer (e.g., via an online banking portal or a mobile banking application).

Figure 3:
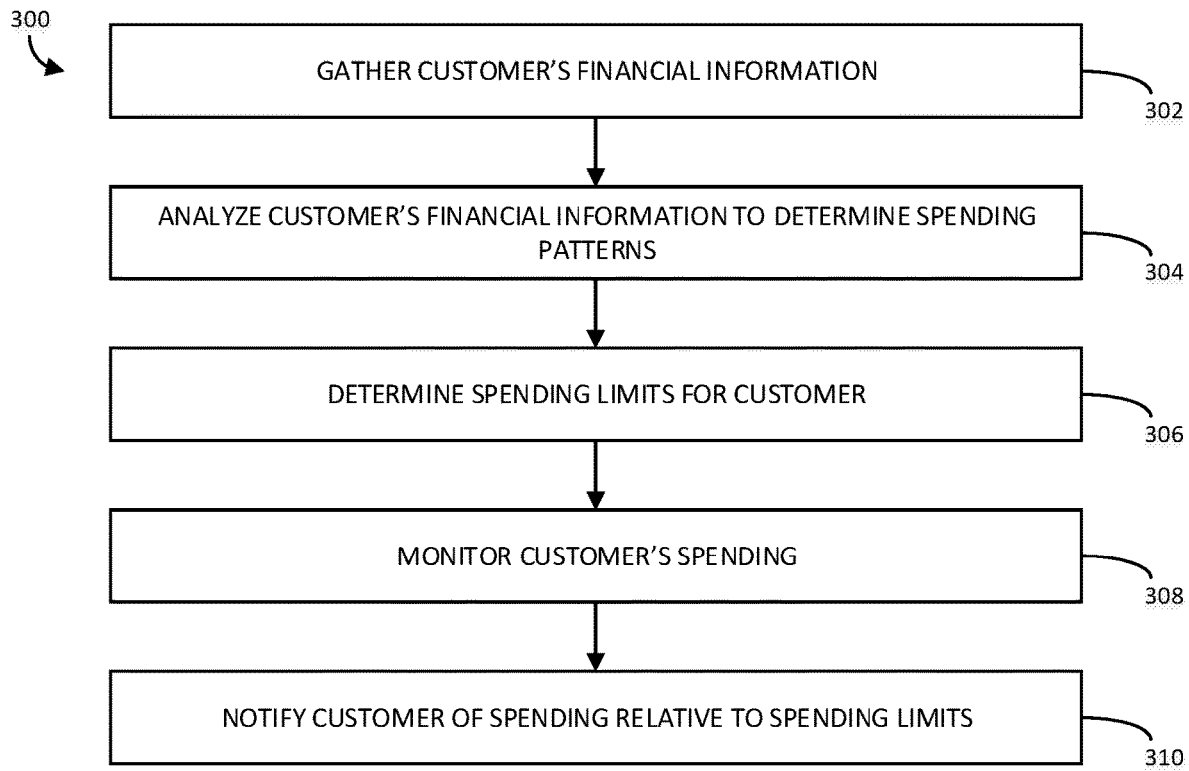
FIG. 3 is a flow diagram of facilitating a customer holding a subscription account with the accounts providing in budgeting, according to an exemplary embodiment.

Referring now to FIG. 3, a method 300 of facilitating a customer holding a subscription account with the accounts provider in budgeting is shown, according to an example embodiment. At 302, the provider computing system 104 gathers the customer's financial data. For example, the provider computing system 104 retrieves historical spending and saving data for the customer over a certain time period (e.g., over the past year, over the past two years, from the beginning of the customer's history with the accounts provider), such as from the customer accounts database 142 and/or from an outside database that the customer provides the accounts provider with permission to access.

At 304, the provider computing system 104 analyzes the customer's financial data to determine spending patterns. In some embodiments, the provider computing system 104 may categorize each of the customer's purchases based on, for example, a merchant associated with the purchase. For example, the provider computing system 104 may categorize each of the customer's purchases into auto/transportation, bills/utilities, business/office, cash/ATM, entertainment, food/drink, home, insurance/financial, miscellaneous, shopping, credit card/loan payments, outgoing transfers, and uncategorized payments categories. Alternatively, in some embodiments, the provider computing system 104 may retrieve a categorization for each of the customer's purchases (e.g., categorized at the time the purchase was processed based on, for example, a merchant associated with the purchase). The provider computing system 104 may then aggregate the customer's purchases in each of the categories to determine spending patterns, such as an average or median amount that the customer spends in each category per month. Additionally, in some embodiments, the provider computing system 104 may analyze the customer's income and/or savings to determine savings patterns for the customers.

At 306, the provider computing system 104 determines spending limits for the customer. In some embodiments, the provider computing system 306 recommends spending limits (e.g., limits in each of the spending categories and/or an overall limit) to the customer based on the customer's spending patterns, the customer's savings patterns, financial goals that the customer has indicated to the provider, and so on. For example, if the customer is saving a healthy amount of his or her income (e.g., 20% of pre-tax income), the provider computing system 306 may recommend that the budget limits be the customer's average spending limits. As another example, if the customer is not saving a healthy amount of his or her income, or the customer has indicated that the customer would like to save up for a financial goal (e.g., paying off the customer's student loans in a certain amount of time, saving up for a down payment on a house), the provider computing system 104 may adjust the recommended spending limits accordingly, such as recommending that the customer spend 10% less in each spending category than the customer currently spends on average. In some embodiments, the provider computing system 104 may use social benchmarking to determine recommended limits for the customer. As an example, the provider computing system 104 may use social benchmarking to determine which categories the customer spends more on than the customer's peers and recommend that the customer scale back spending in those categories, for example, in order to save for the customer's indicated financial goals.

In some embodiments, the provider computing system 104 may use preferences indicated by the customer in determining the spending limits. For example, when setting recommended limits for the customer, the provider computing system 104 may ask the customer what the customer would like the provider computing system 104 to prioritize (e.g., by having the customer select from a list of preferences, by having the customer type preferences and using keyword recognition to identify the customer's preferences). As an illustration, the customer may indicate that the customer likes to dine out and go to the movies but is trying to cut down on driving and plans to use public transportation more often. As such, the provider computing system 104 may set larger recommended limits for food/drink and entertainment and a smaller recommended limit for auto/transportation.

In some embodiments, if the customer does not have enough financial information stored with the provider computing system 104 (e.g., the customer is a new customer of the accounts provider), the provider computing system 104 may not recommend limits for the customer or may recommend limits based on social benchmarking (e.g., the average spending amount for the customer's peers). Additionally, in various embodiments, the customer may be able to adjust the spending limits (e.g., individual spending limits in each of the spending categories and/or the overall spending limit) based on the customer's preferences and confirm the desired spending limits to the provider computing system 104. Alternatively, in some embodiments, the customer may be able to set the spending limits entirely on his or her own with no input from the provider computing system 104 (e.g., by inputting a limit, by dragging a sliding bar to a limit). In such embodiments, steps 302 and 304 may not be performed by the provider computing system 104.

At 308, the provider computing system 104 monitors the customer's spending. For example, for each incoming purchase, the provider computing system 104 classifies the purchase. The provider computing system 104 also aggregate the amount that the customer has spent in each spending category and the total amount that the customer has spent over the current month.

At 310, the provider computing system 104 notifies the customer of spending relative to the customer's spending limits. In some embodiments, the provider computing system 104 sends the customer a regular notification (e.g., bimonthly). The notification may be an email, a text message, a push notification, a pop-up message, a splash page (e.g., shown when the customer logs into an online banking portal or mobile banking application), and so on. Additionally or alternatively, in some embodiments, the provider computing system 104 sends the customer a notification when the customer is near a spending limit (e.g., within 10% of a spending limit) and/or when the customer has exceeded a spending limit for the current month. For example, the provider computing system 104 may send the customer a bimonthly email indicating the customer's total spending over the course of the present month relative to the customer's total spending limit. As another example, the provider computing system 104 may text the customer when the customer is near (e.g., within 10% or 15% of) and/or when the customer has exceeded a spending limit.

Figure 4:
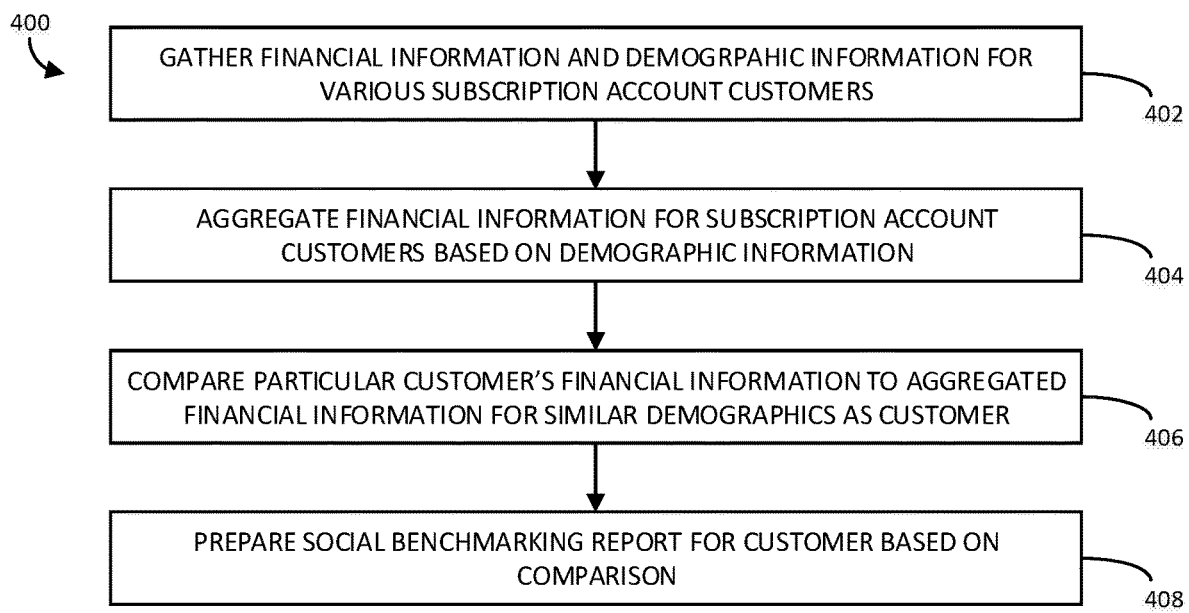
FIG. 4 is a flow diagram of providing a social benchmarking report to the customer, according to an exemplary embodiment.

Referring now to FIG. 4, a method 400 of providing a social benchmarking report to the customer is shown, according to an example embodiment. At 402, the provider computing system 104 gathers financial information and demographic information for various subscription account customers. In some embodiments, the provider computing system 104 retrieves demographic or biographical information and financial information for various subscription account customers (e.g., customers who have opted into or not opted out of the social benchmarking) from the customer accounts database 142. Additionally, in some embodiments, the provider computing system 104 gathers outside demographic and financial information for the various subscription account customers. For example, a subscription account customer may provide the provider computing system 104 with login information for one or more additional financial accounts that the customer holds with a third party. The provider computing system 104 may log in to the one or more additional financial accounts using the login information and gather additional financial information for the customer by screen scraping the financial information for the one or more additional accounts once logged in. As another example, the provider computing system 104 may use credit score information for the various subscription account customers. As another example, the provider computing system 104 may access social media information for the subscription account customers (e.g., based on the customers giving the provider computing system 104 permission to access the customers' social media) by using APIs and gather additional demographic information about the various customers from their social media accounts (e.g., by screen scraping).

At 404, the provider computing system 104 aggregates financial information for the various subscription account customers based on the demographic information. In various embodiments, the provider computing system 104 removes any customer identifiers from the demographic and financial information (e.g., from the metadata for the demographic and financial information) such that the demographic and financial information is anonymous. The provider computing system 104 then aggregates the financial information according to various demographic categories based on the demographic information, such as by gender, age, income level, stage of life, geographic area, and so on.

At 406, the provider computing system 104 compares a particular customer's financial information to aggregated financial information for other subscription account customers with similar demographics as the particular customer. For example, the provider computing system 104 retrieves the particular customer's demographic information from the customer accounts database 142. The provider computing system 104 then analyzes the customer's demographic information to identify the subset of aggregated financial information that most closely corresponds to the customer's peers (e.g., based on the customer's gender, age, income level, stage of life, geographic area, and so on). In some embodiments, the customer may additionally or alternatively select particular demographics that the provider computing system 104 should use in determining the customer's peers. As an example, the provider computing system 104 may provide the customer with demographics that the customer can select from (e.g., gender, age, income level, stage of life, geographic area), and the provider computing system 104 uses the selected demographics in determining the subset of aggregated financial information to compare to the customer. In some embodiments, the customer may additionally or alternatively select a specificity of the demographics used (e.g., the span of the age range for the comparison peer group). Further, in some embodiments, the customer may be able to view aggregated financial information for other customers dissimilar from the particular customer (e.g., by specifying that the customer would like to view aggregated financial information for a different gender, age, income level, stage of life, and/or geographic area) The provider computing system 104 then determines how the customer's financial information compares to the comparison group subset of the aggregated financial information, for example, by retrieving the customer's financial information from the customer accounts database 142 and/or financial information from outside sources for a certain period of time (e.g., over the past month, over the past year, from the start of the customer's financial history with the accounts database). In some embodiments, the customer may also be able to select the period of time for the provider computing system 104 to use in the social benchmarking.

At 408, the provider computing system 104 prepares a social benchmarking report for the particular customer based on the comparison to the peer group. The social benchmarking report may include averages or medians (e.g., the customer's average spending compared to the average spending of the customer's peers), charts (e.g., a bar chart showing how different percentages of the customer's peers spend compared to the customer), and so on. The social benchmarking report may also include one or more breakdowns of the customer's finances compared to the customer's peers, such as an income breakdown, a savings breakdown, a general spending breakdown, and a spending breakdown by category. In some embodiments, the social benchmarking report may be shown in response to a request by the customer (e.g., by the customer navigating to a social benchmarking page on an online banking portal or a mobile banking application). In other embodiments, the social benchmarking report may be shown to the customer as part of a welcome page or a home page (e.g., on an online banking portal or mobile banking application). Additionally, in various embodiments, the social benchmarking report may be prepared for the customer on demand (e.g., in response to the customer navigating to the social benchmarking page) or on a regular basis (e.g., weekly, monthly, bimonthly). In some embodiments, the provider computing system 104 may prepare modified or updated social benchmarking reports in response to a request by the customer. For example, the customer may set a peer grouping (e.g., request a report for customers in a similar age group, request a report for a specified group of friends that have given the customer permission to access their financial information). In response, the provider computing system 104 may prepare an updated social benchmarking report based on the set peer group.

Figure 5:
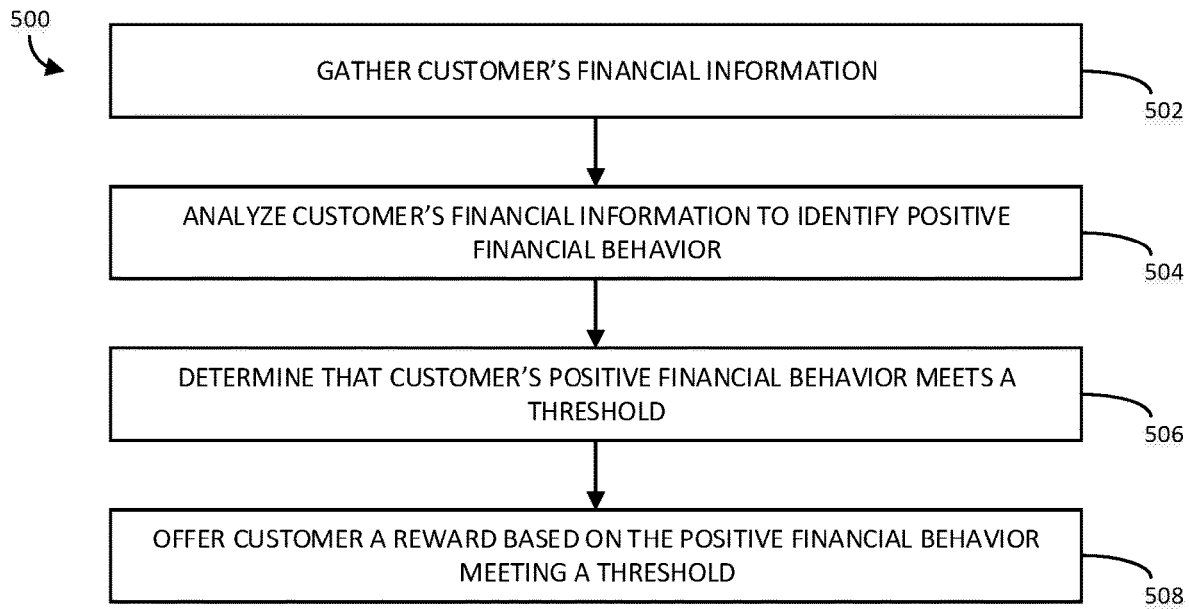
FIG. 5 is a flow diagram of offering a customer a reward in response to positive financial behavior, according to an exemplary embodiment.

Referring now to FIG. 5, a method 500 of offering a customer a reward in response to positive financial behavior is shown, according to an example embodiment. At 502, the provider computing system 104 gathers the customer's financial information (e.g., from the customer accounts database 142). In some embodiments, the provider computing system 104 gathers the customer's financial information for a certain period of time (e.g., over the past year). In some embodiments, the provider computing system 104 gathers the customer's financial information for all accounts held with the accounts provider, such as a savings account, a credit account, and a mortgage held with the provider in addition to the subscription account. Further, in certain embodiments, the provider computing system 104 only performs method 500 for customers holding one or more accounts in addition to the subscription account with the accounts provider.

At 504, the provider computing system 104 analyzes the customer's financial information to identify positive financial behavior. In some embodiments, the provider computing system 104 may use machine learning techniques to categorize various transactions of the customer as "positive." For example, for a mortgage account, the provider computing system 104 may classify an on-time mortgage payment as positive. As another example, for a credit account, the provider computing system 104 may classify paying partially or in full the credit account balance for a given month as positive (e.g., which maintains good credit history for the customer). As another example, for a checking account, the provider computing system 104 may classify a transfer to a savings account or an investment account as positive.

At 506, the provider computing system 104 determines that the customer's positive financial behavior meets a threshold. For example, the provider computing system 104 may count the number of positive financial decisions made by the customer and determine whether that number meets the threshold. As another example, the provider computing system 104 may count the number of positive financial decisions made by the customer in certain categories, such as transfers to savings or paying a bill on time, and determine whether the number in each category meets a threshold. As another example, the provider computing system 104 may determine whether a dollar amount corresponding to positive financial decisions made by the customer, such as the dollar amount the customer has transferred to savings, and determine whether that dollar amount meets the threshold. In some embodiments, the provider computing system 104 also takes the customer's negative financial behavior into account when determining whether the financial behavior meets a threshold. As an illustration, the provider computing system 104 may classify a late mortgage payment as negative financial behavior. As such, the provider computing system 104 may offset counts of positive financial behavior by counts of negative financial behavior in determining whether the customer's positive financial behavior meets the threshold.

At 508, the provider computing system 104 offers the customer a reward based on the positive financial behavior meeting a threshold. As an example, if the provider computing system 104 determines that the customer has made a year of mortgage payments on time, the provider computing system 104 offers the customer a reward of four free ridesharing rides. In some embodiments, the provider computing system 104 uses a benefit that the customer has indicated as desirable (e.g., the customer has selected as one of the customer's top two third-party outside benefits). Alternatively, or additionally, in some embodiments, the provider computing system 104 uses a reward related to the positive financial behavior. For example, if the positive financial behavior is the customer paying off the customer's credit card in full for six months, the provider computing system 104 may offer the customer a 1% additional cashback bonus for a month. Alternatively, or additionally, in some embodiments, the provider computing system 104 may allow the customer to select the reward (e.g., from a list of possible rewards accessible through an online banking portal or mobile banking website).

Figure 6:
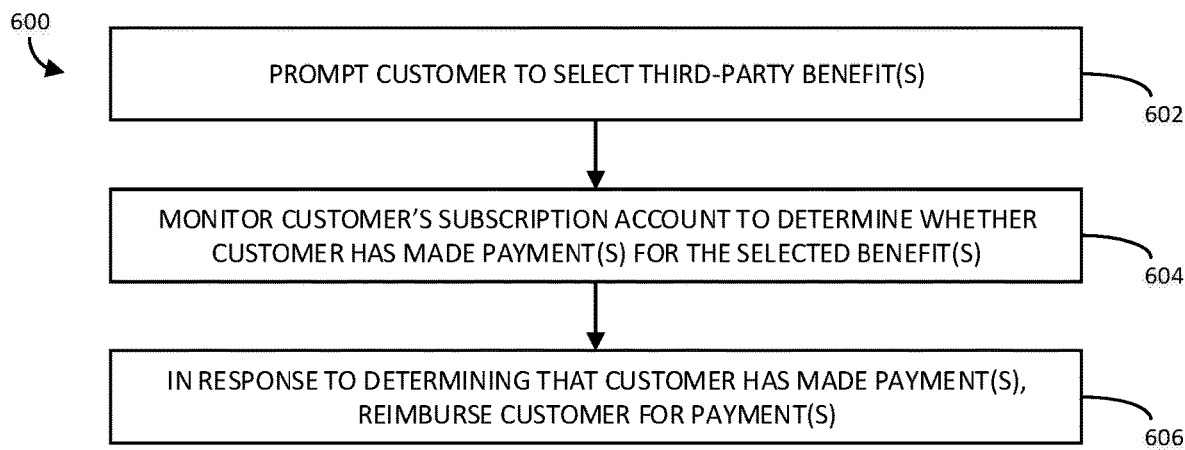
FIG. 6 is a flow diagram of providing an outside benefit to a customer, according to an exemplary embodiment.

Referring now to FIG. 6, a method 600 of providing a third-party benefit to a customer is shown, according to an example embodiment. At 602, the provider computing system 104 prompts the customer to select one or more third-party benefit(s) (e.g., via a user interface provided to the customer through an online banking portal or mobile banking application). The selectable benefits may be provided to the customer as a scrollable list, as a searchable list, and so on. In some embodiments, the provider computing system 104 may vary the outside benefits that the customer can select from according to the customer's subscription tier. As an example, a customer subscribing to a lower, silver level may be able to select between a video streaming service and an audio streaming service. By contrast, a customer subscribing to a higher, gold level may be able to select (1) between a video streaming service and an audio streaming service and (2) between a ridesharing service, and a meal delivery service. In some embodiments, the provider computing system 104 prompts the customer to select a first desired benefit as a primary benefit and a second desired benefit as a secondary benefit. If the provider computing system 104 determines that the customer has no benefits currently selected, or just one desired benefit selected, the provider computing system 104 prompts the customer to select both a primary benefit and a secondary benefit (e.g., by sending the customer an email, by redirecting the customer to a benefit selection page when the customer logs into an online banking portal). Alternatively, in some embodiments, the provider computing system 104 may recommend one or more third-party benefits to the customer to select based on, for example, benefits selected by the customer's peers (e.g., using a social benchmarking process), benefits the customer is currently subscribing to, and/or by determining, with the customer's permission, which outside vendors the customer currently has accounts with (e.g., by accessing customer accounts databases stored at the one or more vendor computing systems 106). Additionally, in various embodiments, the customer may modify the selected benefit(s) at any time (e.g., by navigating to a benefits page on an online banking portal or mobile banking application).

At 604, the provider computing system 104 monitors the customer's subscription account to determine whether the customer has made payment(s) for the selected benefit(s). In various embodiments, the provider computing system 104 monitors the customer's subscription account to determine whether the customer has made a payment for at least the first selected outside benefit (e.g., the primary benefit) for the present month.

At 606, in response to determining that the customer has made the payment(s), the provider computing system 104 reimburses the customer for the payment(s). In various embodiments, the provider computing system 104 reimburses the customer up to the amount of the customer's monthly subscription fee. In some embodiments, if the reimbursed amount for the benefit is less than the customer's monthly subscription fee, the provider computing system 104 also reimburses the customer for the customer's second selected outside benefit (e.g., the secondary benefit), up to a total amount of the customer's monthly subscription fee. Alternatively, in some embodiments, if the reimbursed amount for the benefit is less than the customer's monthly subscription fee, the provider computing system 104 directly reimburses the customer's subscription account up to a total amount of the customer's monthly subscription fee.

In some embodiments, if the customer cancels the primary third-party benefit, the provider computing system 104 reimburses the customer's secondary third-party benefit, up to the amount of the customer's monthly subscription fee. Alternatively, if the customer has not selected a secondary benefit, the provider computing system 104 reimburses the customer's monthly subscription fee directly into the customer's subscription account. The provider computing system 104 may determine that the customer has cancelled the first selected outside benefit in response to, for example, not detecting a payment made by the customer to cover the outside benefit from the customer's subscription account over the entirety of the present month, an indication from the customer (e.g., an internal message) that the customer has cancelled the first selected outside benefit, or by accessing the customer's benefit account with the third-party vendor.

Alternatively, in some embodiments, the provider computing system 104 may not reimburse the customer for payment(s) at 606. Instead, the provider computing system 104 may directly make a payment to the vendor providing the outside benefit. For example, the accounts provider may negotiate with the vendor to receive a discount on the individual fee for each customer desiring the vendor's services (e.g., due to the number of customers the accounts provider is providing to the vendor). Then, the provider computing system 104 may make a bulk payment to the vendor for all customers desiring the vendor's services (e.g., a monthly payment for all customers using the vendor's services as the third-party benefit for the subscription account). In this way, the accounts provider may earn a profit from the subscription fees paid by the customers in that the individual customer is receiving the same amount of benefits but the accounts provider is paying less for those benefits than the individual customer would have.

Figure 7A:
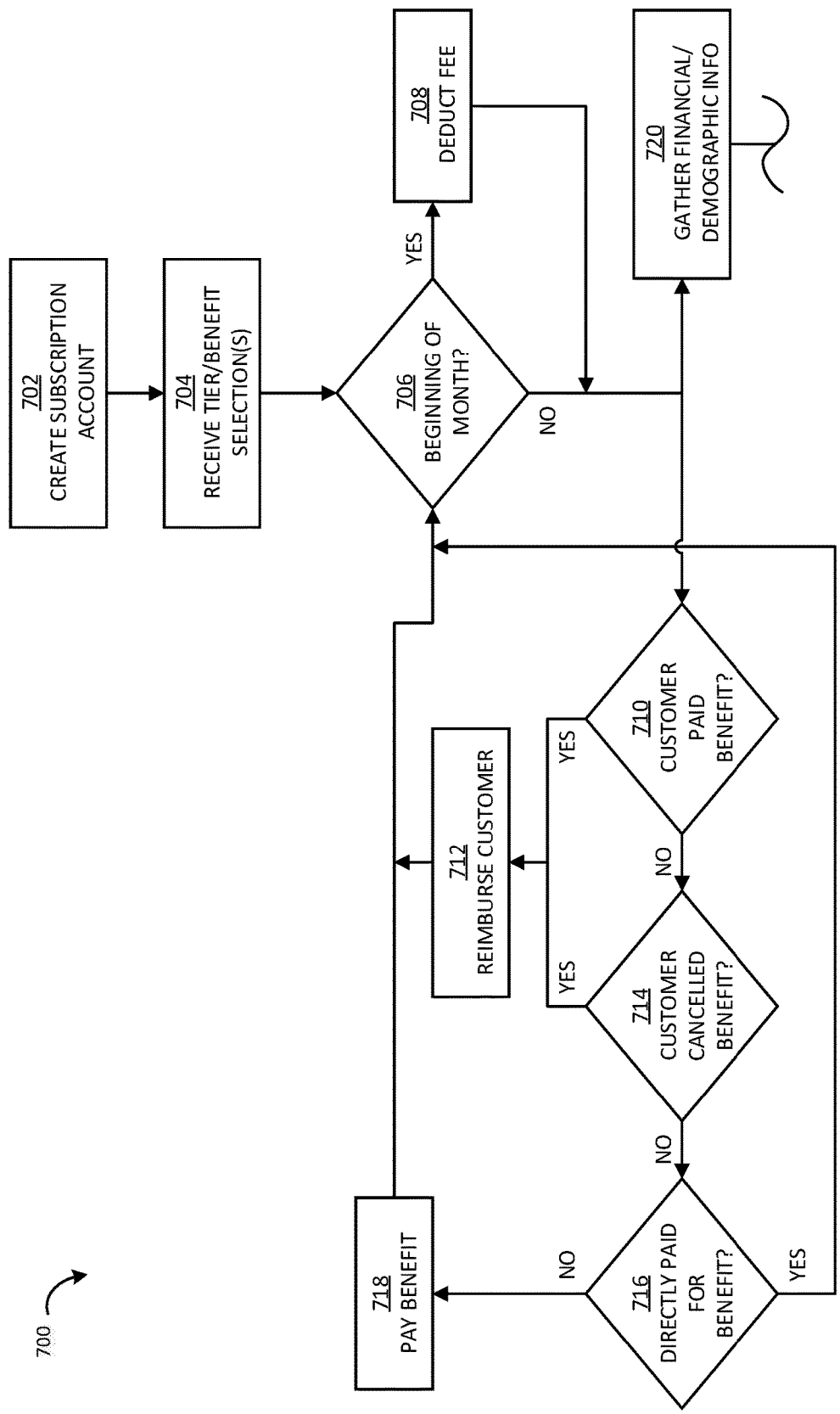
FIGS. 7A and 7B are a flow diagram of providing a customer with benefits for a subscription account, according to an exemplary embodiment.
Figure 7B:
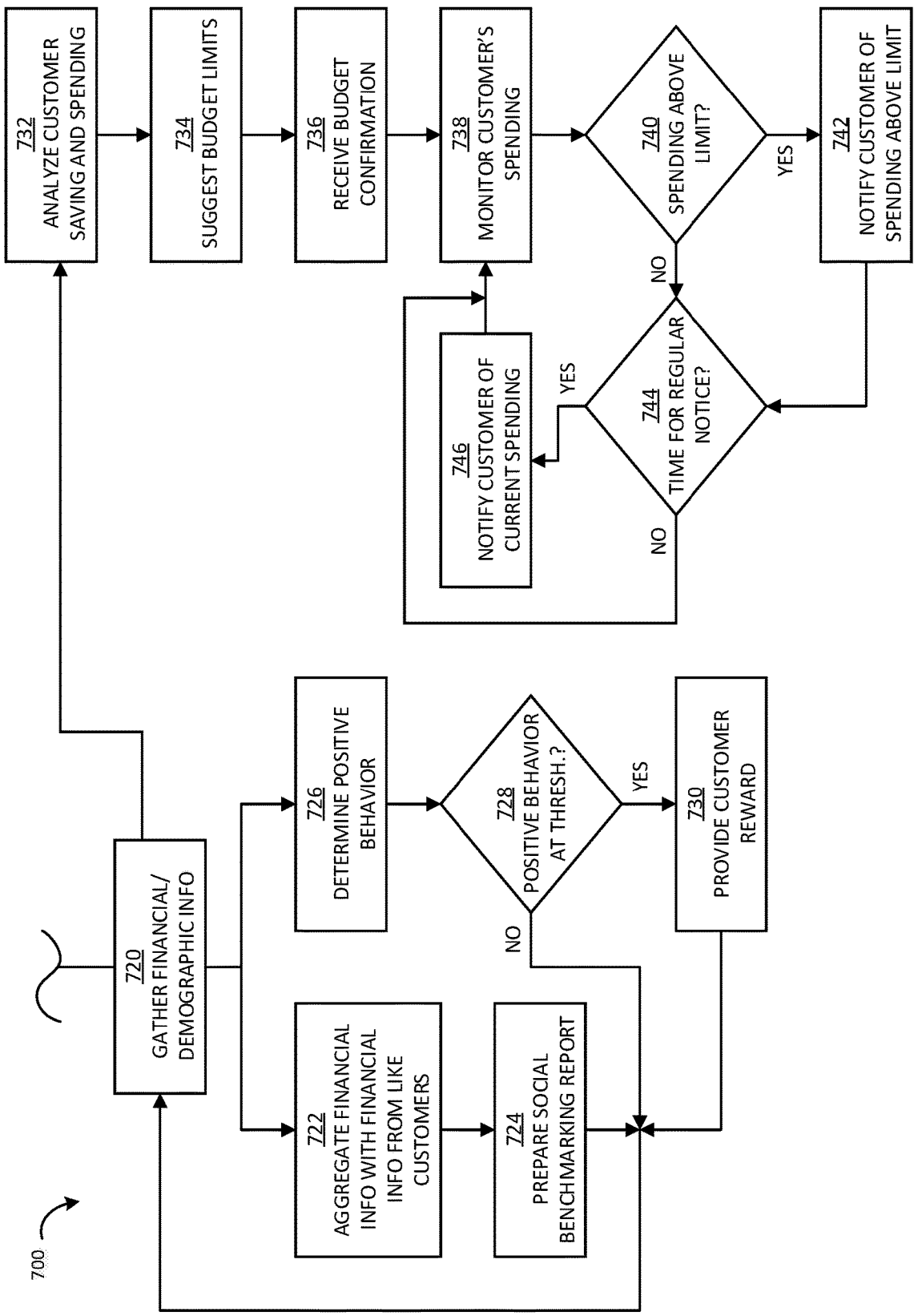

Referring now to FIGS. 7A and 7B, a flow chart 700 of providing the customer with benefits for a subscription account is shown, according to an example embodiment. In various embodiments, the steps of the flow chart 700 are performed by the provider computing system 104 according to the processes and methods described above. Referring first to FIG. 7A, at 702, the provider computing system 104 creates a subscription account for the customer (e.g., by creating a new account for the customer or converting an existing account to a subscription account). At 704, the provider computing system receives tier and third-party benefit selections from the customer. For example, the customer selects a subscription tier, where the subscription tier is associated with a certain number and/or amount of benefits. The customer next selects and orders the third-party benefits that the customer would like to receive. For example, the customer selects a primary benefit and a secondary benefit. In some arrangements, the benefits the customer can select are tied to the subscription tier selected by the customer. Alternatively, in some arrangements, the customer does not select a tier (e.g., because all subscription accounts are offered at a single level with the same benefits), and the customer only selects benefits at 704.

At 706, the provider computing system 104 determines whether it is currently the beginning of the month. If it is the beginning of the month, the provider computing system 104 deducts the subscription fee from the customer's subscription account at 708. Alternatively, at 706, the provider computing system 104 may determine whether it is currently a day of the month selected by the customer for the withdrawal of the subscription fee and deduct the subscription fee at 708 if it is that day of the month.

At 710, the provider computing system 104 determines whether the customer has already paid for the top-rated benefit (e.g., primary benefit) selected by the customer at 704. For example, the provider computing system 104 may monitor payments made by the customer's subscription account to determine if one of the payments made this month is for the primary benefit. If the provider computing system 104 determines that the customer has paid for the primary benefit, the provider computing system 104 reimburses the customer for the amount of the benefit (e.g., up to the amount of the customer's subscription fee) at 712. In some embodiments, the provider computing system 104 may also notify the customer that the customer does not need to pay for the benefit directly because the provider computing system 104 will directly pay the vendor offering the benefit going forward. For example, if the customer usually pays for the benefit periodically (e.g., monthly), the provider computing system 104 will indicate to the customer that the customer does not need to pay the benefit directly to the vendor for upcoming or future periods during which the benefit fee will again be due.

If the provider computing system 104 determines that the customer has not paid for the benefit, the provider computing system 104 determines whether the customer has cancelled the benefit at 714. For example, the provider computing system 104 determines whether the customer has notified the provider computing system 104 that the customer has cancelled an account with the vendor providing the benefit. If the provider computing system 104 determines that the customer has cancelled the benefit, the provider computing system 104 reimburses the customer (e.g., for the amount of the subscription fee paid by the customer for the month) at 712. Alternatively, the provider computing system 104 reimburses the customer for a secondary benefit selected by the customer, or directly pays for the secondary benefit at 716, and prompts the customer to reselect the primary and secondary benefits for the customer's subscription account.

If the provider computing system 104 determines that the customer has not cancelled the benefit, the provider computing system 104 determines whether the accounts provider has already directly paid for the benefit (e.g., for the present month) at 716. As an example, the provider computing system 104 determines whether the current date is a day of the month on which the provider computing system 104 directly pays the third-party vendor for all customers who have selected the benefit associated with the third-party vendor according to a pre-negotiated agreement between the accounts provider and the vendor. If the provider computing system 104 determines that the accounts provider has not already directly paid for the benefit (and, for example, the payment for the benefit is due), the provider computing system 104 directly pays the vendor for the benefit at 718. For example, the provider computing system 104 may transfer a bulk payment for all customers who have selected the benefit to the vendor offering the benefit. After paying for the benefit at 718 or determining that the accounts provider has already paid for the benefit at 716, the provider computing system 104 returns to determining whether it is the beginning of the month (or, in some embodiments, the day of the month that the customer has selected for payment of the subscription fee) at 706.

At 720, the provider computing system 104 (e.g., in parallel to 710, 712, 714, 716, and 718) gathers financial and demographic information about the customer. For example, the provider computing system 104 may retrieve biographical and financial information for the customer stored in the customer accounts database 142, use login information provided by the customer to gather outside financial information for the customer, access (e.g., with the customer's permission) the customer's social media to gather demographic information for the customer, and so on. The provider computing system 104 then uses the financial and demographic information to provide various services for the customer, as shown in further detail in FIG. 7B.

At 722, the provider computing system 104 aggregates the customer's financial information with financial information for other similar customers of the accounts provider. For example, the provider computing system 104 may remove any personal identifying information from the customer's financial information and aggregate the customer's financial information with other customers similar to the customer based on an analysis of the customer's demographic information (e.g., to identify other customers similar to the customer based on age, income level, stage in life, etc.). At 724, the provider computing system 104 prepares a social benchmarking report for the customer based on the aggregated financial information. As an illustration, the provider computing system 104 prepares one or more charts or graphs comparing the customer's spending and savings habits to spending and savings habits of the aggregated customers similar to the customer. The provider computing system 104 may display the social benchmarking report on an online banking portal or mobile banking application accessed by the customer, may email the social benchmarking report to the customer, and so on. In some embodiments, the customer may select the demographics to be used in the social benchmarking report, and the provider computing system 104 may update the report accordingly. Afterwards, the provider computing system 104 returns to gathering financial and demographic information for the customer at 720.

At 726, the provider computing system 104 analyzes the customer's financial information to determine positive behavior for the customer. For example, the provider computing system 104 identifies various discrete financial decisions made by the customer (e.g., paying a credit card bill on time, paying a credit card bill off in full each month, making a mortgage payment late) and identifies positive financial behavior. At 728, the provider computing system 104 determines whether the customer's positive behavior meets a threshold. As an example, the provider computing system 104 determines whether the customer has made a certain threshold number of positive decisions over a certain amount of time. As another example, the provider computing system 104 determines whether the customer has made a certain threshold dollar amount of positive decisions over a certain period of time. As another example, the provider computing system 104 determines whether the customer has made a certain threshold number of positive types of decisions over a certain amount of time, such as a certain number of on-time mortgage payments over the past year. As another example, the provider computing system 104 may assign a score to each of the customer's discrete positive financial decisions, tally the customer's total score over a certain period of time, and determine whether the score meets a certain threshold score number. In some embodiments, once the customer meets a certain threshold, the customer cannot meet the threshold again. As an illustration, a first threshold may be a certain number of on-time mortgage payments over a certain period of time, and a second threshold may be a certain, higher number of on-time mortgage payments over a certain period of time. If the customer has already met the first threshold and received the reward associated with the first threshold, the customer cannot meet the first threshold again and must meet the second threshold to receive a reward.

If the customer does meet the threshold, the provider computing system 104 provides the customer with a reward at 730. In some embodiments, the provider computing system 104 provides the customer with the reward according to the customer's selected third-party benefit(s) at 704 (e.g., provides the customer with the customer's second-ranked benefit). Alternatively, or additionally, the provider computing system 104 may notify the customer that the customer has earned the reward and allow the customer to select the reward, for example, from a list of potential rewards. The list of potential rewards may be the same for all customers, may be tied to the positive financial behavior of the customer, and/or may vary depending on the threshold of positive behavior met by the customer (e.g., the customer may receive a larger reward for more positive financial behavior, such as a payment for additional months of the reward). After providing the customer with the reward at 730 or determining that the customer's positive behavior does not reach the threshold at 728, the provider computing system 104 returns to gathering financial and demographic information for the customer at 720.

At 732, the provider computing system 104 analyzes the customer's saving and spending. For example, the provider computing system 104 determines a total amount that the customer is saving per month on average, a total amount that the customer is spending on month per average, and a total amount that the customer is spending in each of predefined categories per month on average. At 734, the provider computing system 104 suggests budget limits to the customer. As an example, the provider computing system 104 may suggest that the customer stay under the average amount that the customer spends per month in each predefined category. In some embodiments, the provider computing system 104 takes savings goals into account for the customer when suggesting the budget limits, such as a suggested amount that the customer should save per month or financial goals indicated by the customer to the provider computing system 104. At 736, the provider computing system receives a budget confirmation 736 from the customer. For example, the customer may be able to adjust the suggested budget limits and confirm the adjusted budget limits as the desired budget limits. Alternatively, in some embodiments, the customer may provide the budget limits directly to the provider computing system 104 such that the provider computing system 104 does not perform 732 and 734.

At 738, the provider computing system 104 monitors the customer's spending. As an example, the provider computing system 104 monitors an amount that the customer spends in each of the predefined categories over the course of the present month. At 740, the provider computing system 104 determines whether the customer has spent above any of the customer's budget limits (e.g., over the course of the present month to date), such as a total limit for the customer's budget or an individual limit for a predefined category. At 742, the provider computing system 104 notifies the customer of spending above the limit. For example, the provider computing system 104 may send the customer an email, text the customer, send the customer a push notification, and so on. In some embodiments, the provider computing system 104 may also determine whether the customer is within a certain amount (e.g., 10% or 15%) of a budget limit and notify the customer accordingly at 740 and 742.

After notifying the customer of spending above the limit at 742 or determining that the customer has not spent above any limit at 740, the provider computing system 104 determines whether it is time for a regular notice regarding the customer's spending relative to the set budget limits at 744. In some embodiments, the provider computing system 104 may provider the customer with bimonthly notice, monthly notice, or regular notice with a frequency selected by the customer of the customer's spending. As such, the provider computing system 104 determines whether it is presently time to provide the regular notice to the customer (e.g., determines whether it is the last day of the month, on which the customer is sent a summary of the customer's spending and saving for the month). If it is time for the regular notice, the provider computing system 104 notifies the customer of the customer's current spending at 746 (e.g., the customer's spending over the course of the present month). For example, the provider computing system 104 may send the customer an email, text the customer, send the customer a push notification, and so on with a spending report. In some arrangements, the regular notice may also include the customer's current saving (e.g., the customer's saving over the course of the present month). After notifying the customer of the customer's current spending at 746 or determining that it is not time for regular notice at 744, the provider computing system 104 returns to monitoring the customer's spending at 738.

Referring now to FIGS. 8-15, user interfaces relating to a subscription account are shown, according to example embodiments. In FIGS. 8-15, the user interfaces are shown on the display 124 of the user device 102 as part of a mobile banking application 800 (e.g., implemented as part of the customer subscription circuit 126) created by the accounts provider. However, it should be understood that the user interfaces shown in FIGS. 8-15 are exemplary and that other arrangements or configurations of user interfaces may be created and displayed to the user relating to the subscription accounts described herein.

Figure 8:
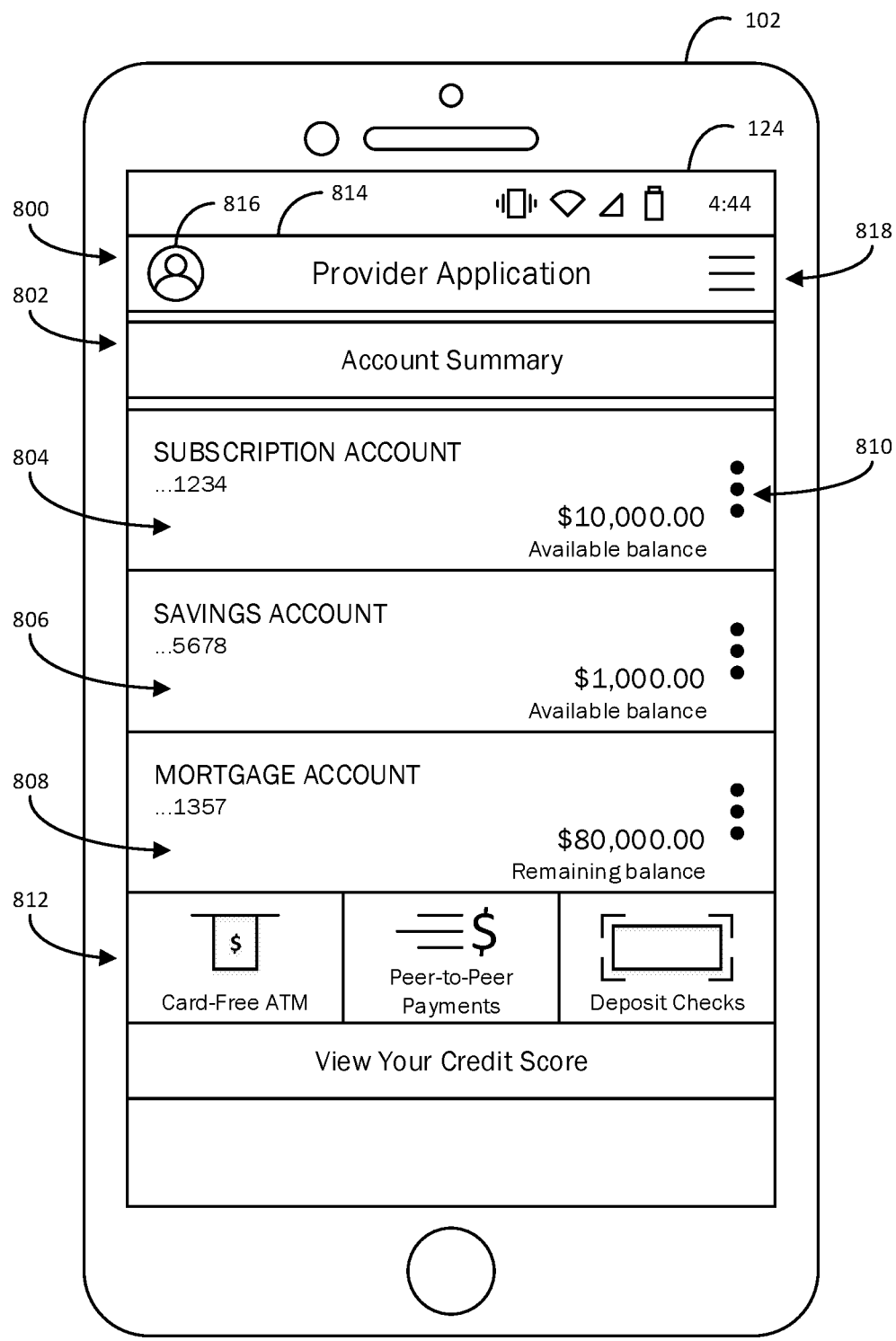
FIG. 8 illustrates a user interface including an accounts summary page, according to an exemplary embodiment.

FIG. 8 illustrates an accounts summary page 802 of the mobile banking application 800. In some embodiments, the accounts summary page 802 may serve as a home screen for the application 800 (e.g., shown to the customer when the customer first logs into the application 800). As shown in FIG. 8, the accounts summary page 802 includes a list of the customer's accounts held with the accounts provider. In the example of FIG. 8, the accounts summary page 802 includes a subscription account section 804, a savings account section 806, and a mortgage account section 808. Each of the sections 804, 806, and 808 includes an icon 810 that the customer can select to view more options related to the account. The accounts summary page 802 also includes additional buttons 812 that the customer can press to access other services facilitated by the application 800. For example, in FIG. 8, the accounts summary page 802 includes buttons that the customer can press to access card-free ATM options, send a peer-to-peer payment, deposit a check, and view the customer's credit score.

Figure 9:
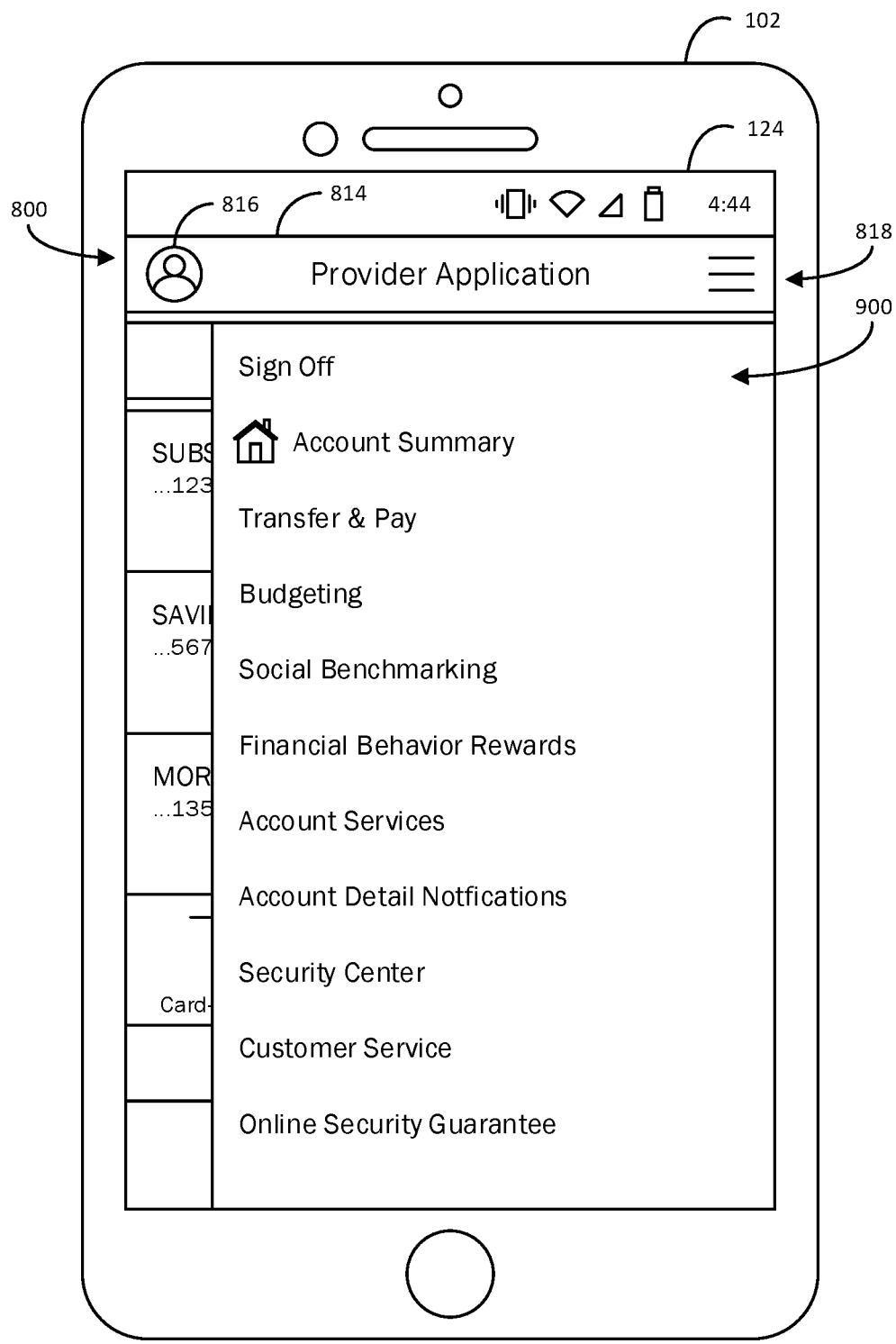
FIG. 9 illustrates a user interface including an accounts summary page with a menu, according to an exemplary embodiment.

As further illustrated in FIG. 8, the application 800 also includes a header 814 that is shown on every page of the application 800. For example, the header 814 includes a profile button 816 that the customer can press to profile options for the customer (e.g., account settings, a message center, an alert center) and a menu button 818 that the customer can press to view additional actions for the application 800. For example, if the customer presses the menu button 818, the customer may be shown a menu 900 extending from the right side of the application 800, as illustrated in FIG. 9. The menu 900 may include various actions that the customer may select from and use to navigate between pages of the application 800.

Figure 10:
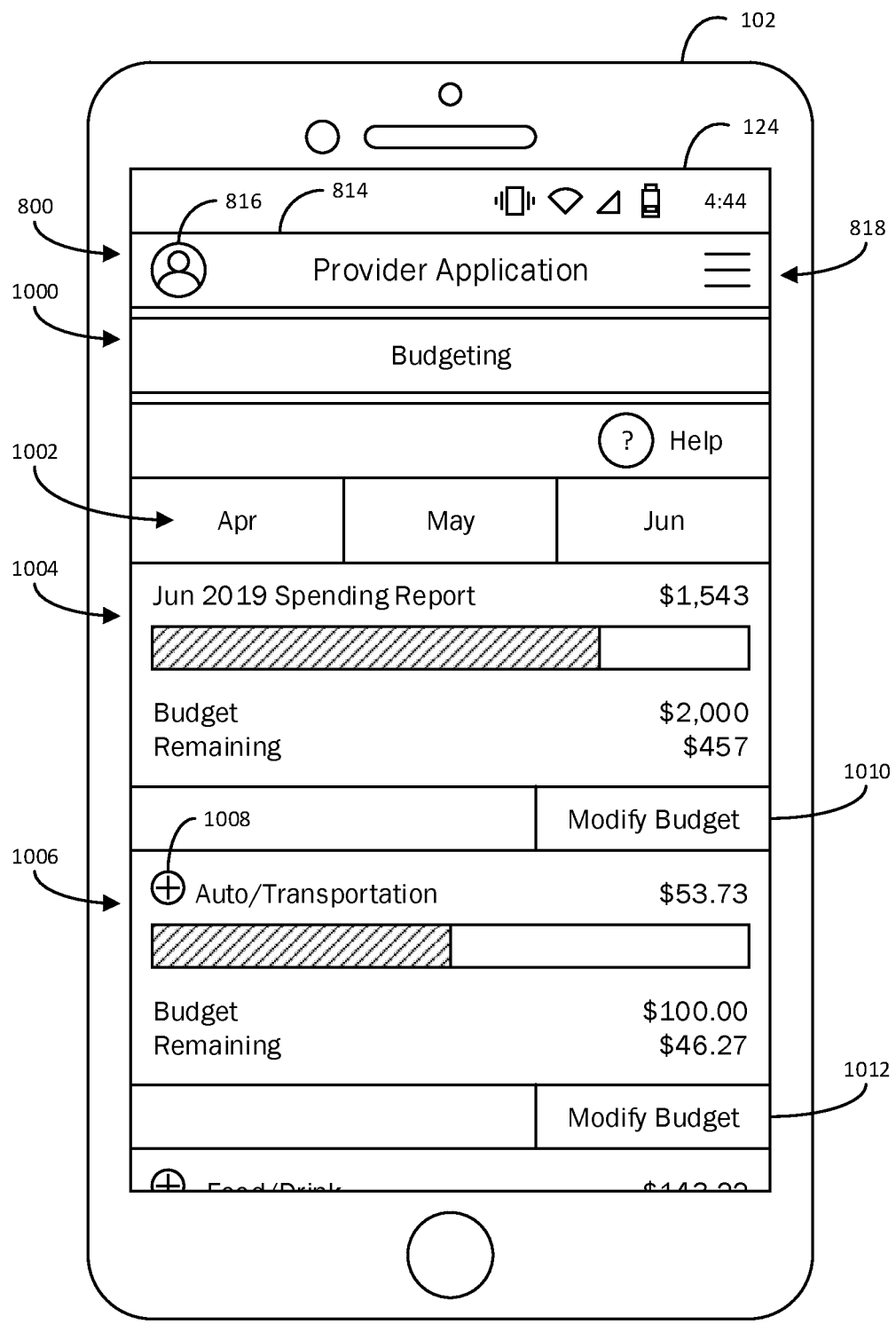
FIG. 10 illustrates a user interface including a budgeting page, according to an exemplary embodiment.

As an illustration, FIG. 10 shows a budgeting page 1000 that the customer may access, for example, by pressing "Budgeting" from the menu 900. The budgeting page 1000 includes month buttons 1002 that the customer may select from to view a budget report for that month. In some arrangements, the customer may be able to swipe the month buttons 1002 to the side in order to view more months that the customer can select from (e.g., in FIG. 10, by swiping the months buttons to the right to view older months to select from). The budgeting page 1000 also shows the customer a budget report for the selected month. In various arrangements, the budget report includes an overall report 1004 as well as one or more sub-reports for specific categories of spending (e.g., a sub-report for auto/transportation 1006, as shown in FIG. 10). The overall report 1004 includes a summary of the overall amount the customer has spent in the selected month, along with the overall budget. For example, if the selected month is the current month, the overall report 1004 may display the spending to date for the current month relative to the overall budget. The sub-report 1006 may similarly include a summary of the amount that the customer has spent in the category for the sub-report 1006, along with the budget for the category. Additionally, the sub-report 1006 may include an expand button 1008 that the customer can press to view more specific spending information in sub-categories of the sub-report. For example, for the auto/transportation sub-report 1006 shown in FIG. 10, the customer may press the expand button 1008 to view spending for gasoline, public transportation, and tolls.

The budgeting page 1000 also includes one or more buttons that the customer can press to modify the budgeting limits. As an example, in FIG. 10, the overall report 1004 includes a first modify budget button 1010 and the sub-report 1006 includes a second modify budget button 1012. In some arrangements, the customer may press the first modify budget button 1010 to modify the overall budget limits for the customer's budget, as well as the limits for each spending category, whereas the customer may press the second modify budget button 1012 to modify the budget limits for the specific spending category associated with the sub-report. When modifying a budget limit the customer may, for example, request that the provider computing system 104 provide recommendations for the modified budget limits and/or input or modify budget limits manually.

Figure 11:
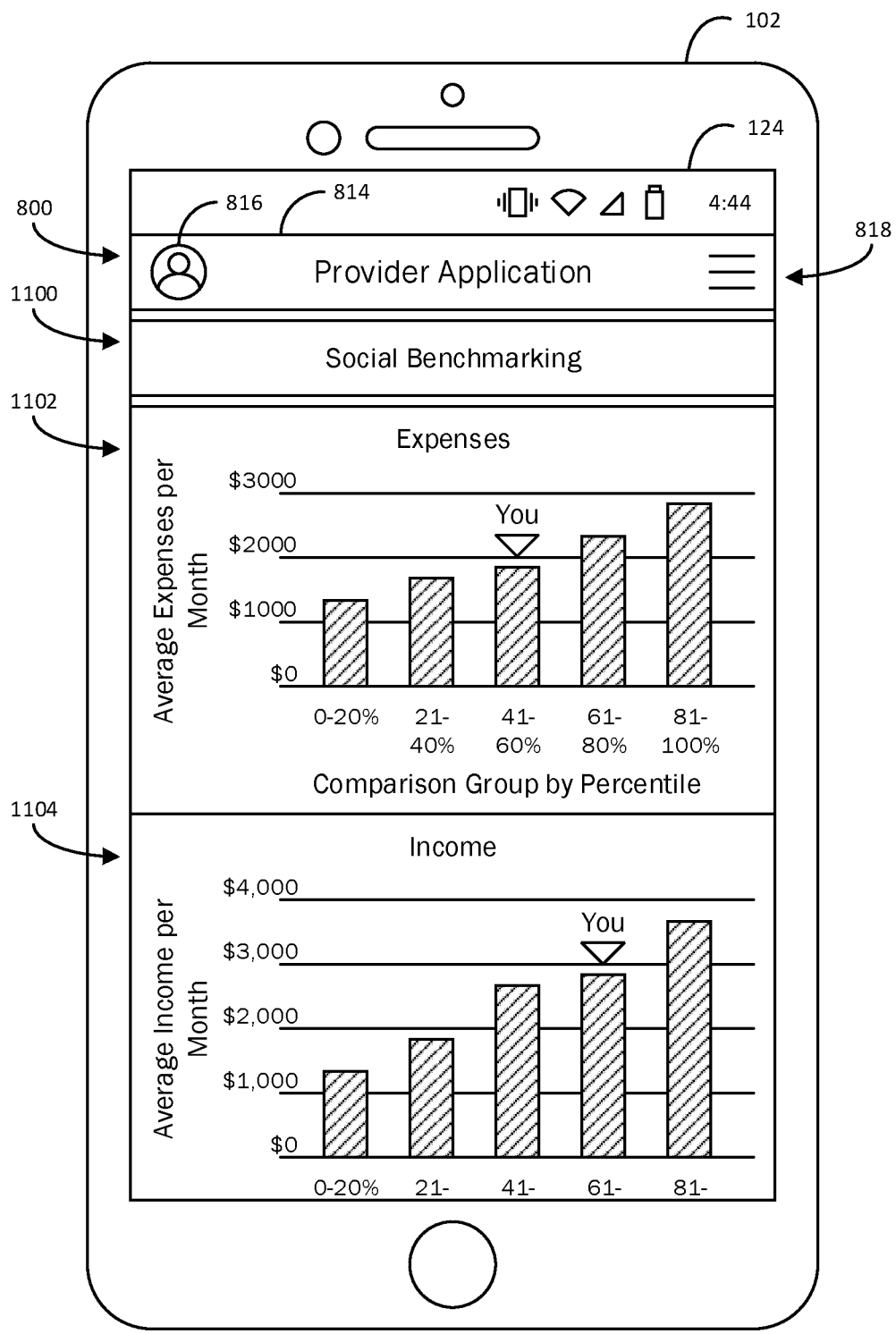
FIG. 11 illustrates a user interface including a social benchmarking page, according to an exemplary embodiment.
Figure 12:
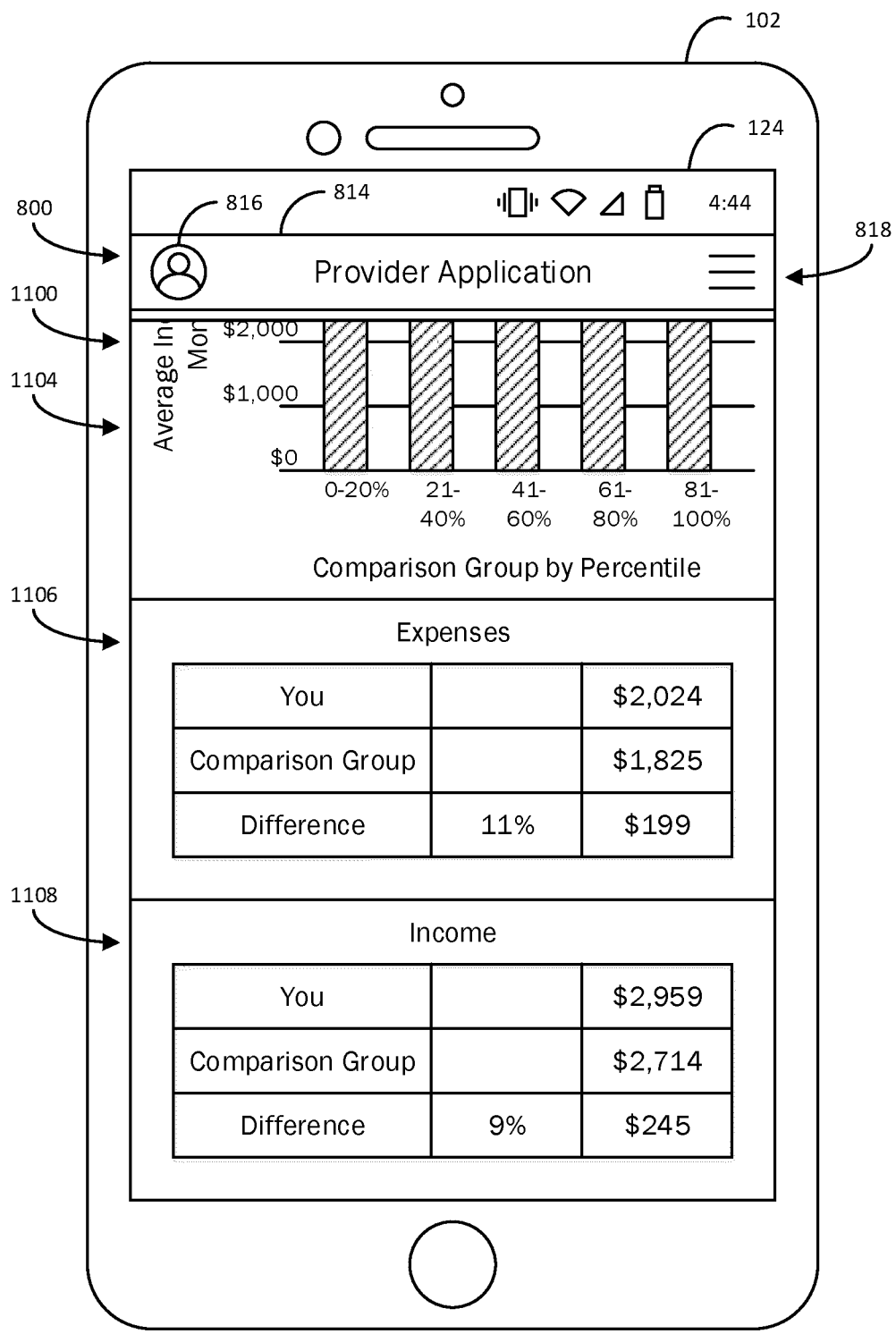
FIG. 12 illustrates a user interface including a social benchmarking page, according to an exemplary embodiment.

FIGS. 11 and 12 show a social benchmarking page 1100 that the customer may access, for example, by pressing "Social Benchmarking" from the menu 900. The social benchmarking page 1100 includes one or more social benchmarking reports prepared for the customer. As an illustration, in the example of FIG. 11, the social benchmarking page 1100 includes an expenses chart 1102 that breaks down the average expenses per month for the comparison group by percentile and an income chart 1104 that breaks down the average income per month for the comparison group by percentile. Each of the expenses chart 1102 and the income chart 1104 also includes an indication of where the customer's average expenses/income fits in relative to the comparison group. Additionally, as shown in the example of FIG. 12, the social benchmarking page 1100 includes an expenses table 1106 that illustrates the customer's average monthly expenses, the average monthly expenses for the comparison group, and the actual and percentage difference between the two. The social benchmarking page 1100 also includes an income table 1108 that illustrates the customer's average monthly income, the average monthly income for the comparison group, and the actual and percentage difference between the two.

It should be understood that the charts 1102 and 1104 and tables 1106 and 1108 are intended to be exemplary and that other social benchmarking reports may be prepared and shown to the customer, such as a chart showing the customer's average monthly savings compared to the average monthly savings of the comparison group. Additionally, in some embodiments, the social benchmarking page 1100 may include one or more buttons, toggles, sliders, dialog boxes, and so on that the customer may interact with to modify the comparison group. For example, the customer may toggle off all demographics used to prepare the social benchmarking reports except age, and the provider computing system 104 may accordingly prepare modified social benchmarking reports that just reflect other customers in the same age group as the customer. The customer may further modify the specificity of the demographics used to prepare the social benchmarking reports. As an example, the customer may drag a slider that determines the age range used to prepare the social benchmarking reports.

Figure 13:
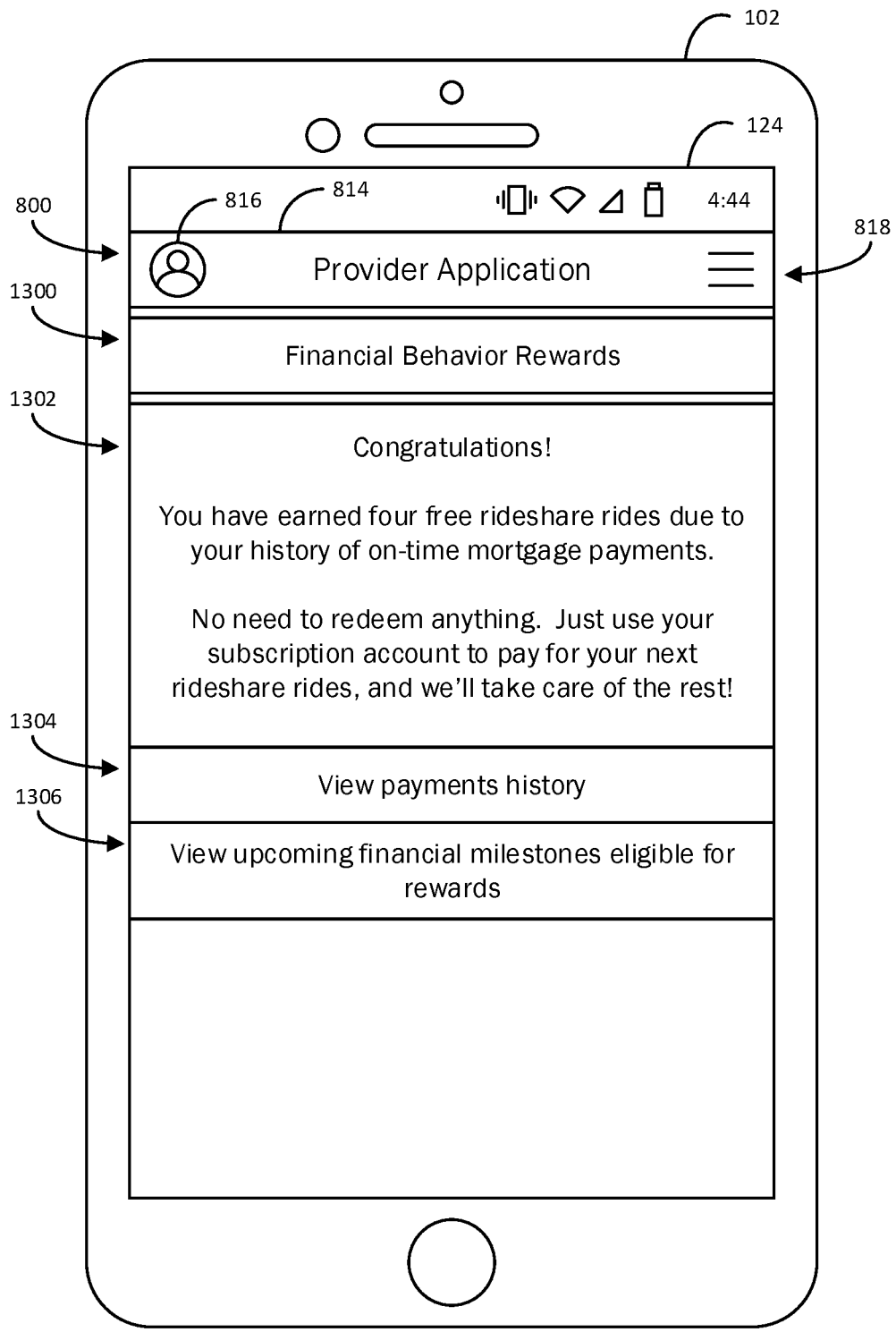
FIG. 13 illustrates a user interface including a financial behavior rewards page, according to an exemplary embodiment.

FIG. 13 illustrates a financial behavior rewards page 1300 that the customer may access, for example, by pressing "Financial Behavior Rewards" from the menu 900. The financial behavior rewards page 1300 includes a 1302 section indicating to the customer whether the customer has earned a reward for positive financial behavior. For example, the section 1302 in the example of FIG. 13 indicates that the customer has earned four free rideshare rides due to the customer's history of on-time mortgage payments and that the customer can use these four free rides by using the customer's subscription account to pay for the customer's next rides. Alternatively, in other examples, the section 1302 may indicate the last reward that the customer earned or an amount and/or type of positive behavior that the customer should engage in to earn a reward. Additionally, the financial behavior rewards page 1300 includes a payments history button 1304 that the customer can select to view the customer's payments history (e.g., that earned the customer the reward) and an upcoming milestones button 1306 that the customer can select to view upcoming financial milestones that the customer can meet to earn other rewards. In other embodiments the financial behavior rewards page 1300 may include different or additional buttons, such as a button that the customer can press to view past rewards that the customer has earned.

Figure 14:
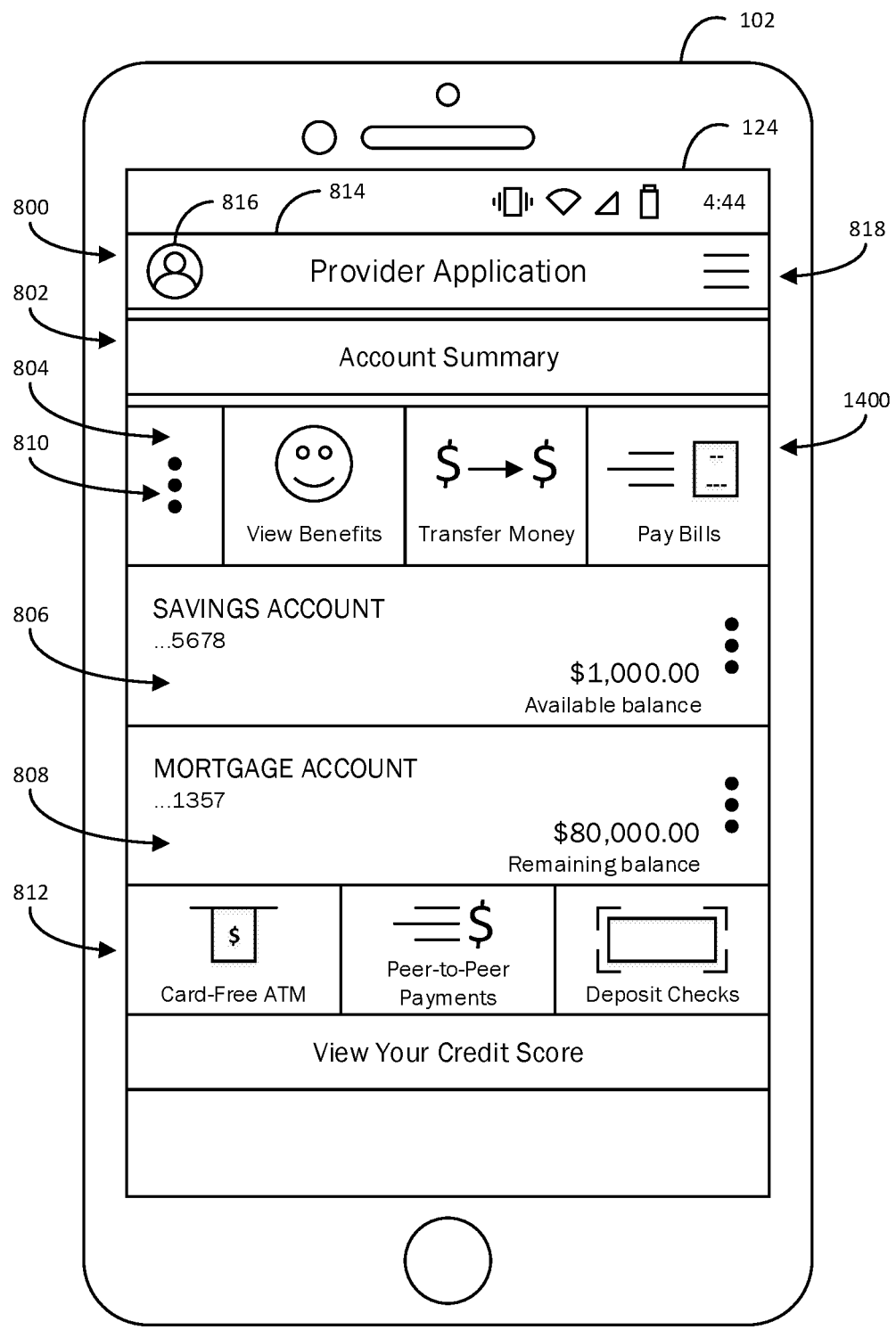
FIG. 14 illustrates a user interface including an accounts summary page, according to an exemplary embodiment.

FIG. 14 shows another illustration of the account summary page 802. In FIG. 14, the customer has selected the more options button 810 for the subscription account section 804. Accordingly, the subscription account section 804 from FIG. 8 has been replaced with an additional options menu 1400 for the customer's subscription account. In the example of FIG. 14, the additional options menu 1400 includes buttons the customer can press to view the third-party benefits associated with the subscription account, to transfer money using the subscription account, and to pay bills using the subscription account.

Figure 15:
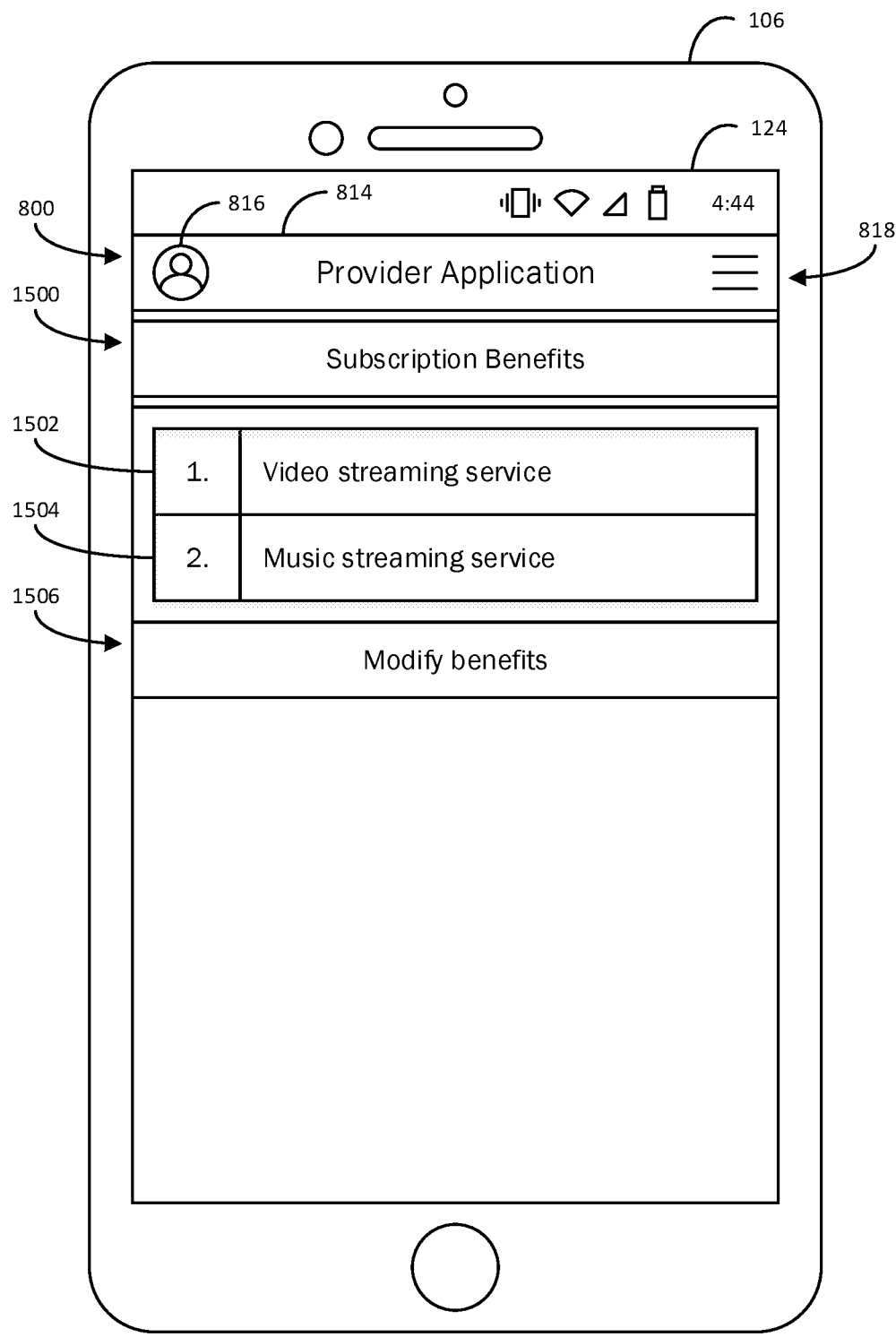
FIG. 15 illustrates a user interface including a subscription benefits page, according to an exemplary embodiment.

FIG. 15 illustrates a subscription benefits page 1500 that the customer may access, for example, by pressing the third-party benefits button from the additional options menu 1400. The subscription benefits page 1500 includes, for example, a primary benefit 1502 and a secondary benefit 1504 selected by the customer. The subscription benefits page 1500 also includes a modify benefits button 1506 that the customer can press to modify the primary benefit 1502 and the secondary benefit 1504. For example, pressing the modify benefits button 1506 may redirect the customer to a page showing all of the potential third-party benefits the customer can be reimbursed for or the accounts provider will directly pay for, and the customer can select the top two benefits the customer would like set as the primary benefit 1502 and the secondary benefit 1504.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits ("IC"), discrete circuits, system on a chip ("SOC") circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits ("ASICs"), field programmable gate arrays ("FPGAs"), digital signal processors ("DSPs"), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud-based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a computing system in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), a distributed ledger (e.g., a blockchain), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data that cause a general purpose computer, a special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should be understood that a "network interface," as used herein, includes any of a cellular transceiver (Code Division Multiple Access (CDMA), Global System for Mobile Communications (GSM), Long-Term Evolution (LTE), etc.), a wireless network transceiver (e.g., 802.11X, ZigBee, or Bluetooth), or a combination thereof (e.g., both a cellular transceiver and a Bluetooth transceiver). In some arrangements, a network interface includes hardware and machine-readable media sufficient to support communication over multiple channels of data communication. Further, in some arrangements, the network interface includes cryptography capabilities to establish a secure or relatively secure communication session between the device including the network interface and other devices of the system 100 via the network 110. In this regard, personal information about clients, financial data, and other types of data is encrypted and transmitted to prevent or substantially prevent the threat of hacking.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Ethereum, Ripple, Litecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method comprising:
   receiving, by a provider computing system, a request from a customer to open a subscription account;
   creating, by the provider computing system, the subscription account for the customer;
   requesting, by the provider computing system, a subscription account preference from the customer, comprising generating a subscription account preference request displayed via a user interface on a device associated with the customer, wherein the subscription account preference comprises at least one topic of interest to the customer;
   receiving, by the provider computing system, the subscription account preference of the customer, the subscription account preference based on an input of the customer via the user interface;
   determining, by the provider computing system, a customized budget for the customer, wherein the customized budget allocates acceptable spending trends to a plurality of categories, and wherein categories associated with the at least one topic of interest identified by the subscription account preference receive a larger spending trend allocation;
   deducting, by the provider computing system, a subscription fee from the subscription account;

determining, by the provider computing system, a benefit for the customer, wherein the benefit is offered by a third-party vendor in exchange for a benefit fee, and wherein the determined benefit is based on the received subscription account preference and does not apply to future periods;

reimbursing, by the provider computing system, the subscription account for the customer by an amount corresponding to the benefit fee;

notifying, by the provider computing system, the customer that the customer does not need to pay the benefit fee for future periods;

aggregating, by the provider computing system, benefit fees for a future period for a plurality of customers including the customer;

paying, by the provider computing system, the aggregated benefit fees;

gathering, by the provider computing system, financial information associated with the customer;

analyzing, by the provider computing system, the financial information to identify positive financial behavior of the customer, wherein analysis comprises a verification that spending trends of the customer comport with the determined customized budget of the customer;

invoking, by the provider computing system and via the user interface, a graphical depiction executable, wherein the graphical depiction comprises a chart generated by the provider computing system;

determining, by the provider computing system, that the positive financial behavior meets a threshold; and offering, by the provider computing system, the customer a reward based on the positive financial behavior meeting the threshold and based on the received subscription account preference.

2. The method of claim 1, wherein the aggregated benefit fees for the plurality of customers includes a negotiated discount with the third-party vendor.

3. The method of claim 1, further comprising prompting, by the provider computing system, the customer to select a subscription tier for the subscription account, wherein the subscription fee is associated with the selected subscription tier.

4. The method of claim 3, wherein the benefit is associated with the selected subscription tier.

5. The method of claim 1, wherein determining the benefit for the customer comprises:

interfacing, by the provider computing system, with a vendor computing system associated with the third-party vendor; and determining, by the provider computing system, based on the interfacing, that the customer already has an account with the third-party vendor associated with the benefit.

6. The method of claim 1, wherein determining the benefit for the customer comprises at least one of:

analyzing, by the provider computing system, a financial history associated with the customer to identify whether the customer has paid for the benefit in the past; or analyzing, by the provider computing system, demographic information associated with the customer to identify the benefit as being selected by other customers holding subscription accounts that are similar to the customer.

7. The method of claim 1, further comprising:

analyzing, by the provider computing system, the financial information to determine spending patterns for the customer;

determining, by the provider computing system, one or more recommended spending limits for the customer based on the spending patterns; and setting, by the provider computing system, a budget for the customer including one or more confirmed spending limits.

8. The method of claim 7, further comprising:

monitoring, by the provider computing system, the customer's spending; and notifying, by the provider computing system, the customer of the customer's spending relative to at least one of the one or more confirmed spending limits.

9. The method of claim 1, further comprising:

gathering, by the provider computing system, financial information and demographic information from a plurality of customers holding subscription accounts;

aggregating, by the provider computing system, the financial information for the plurality of customers based on the demographic information for the plurality of customers;

comparing, by the provider computing system, financial information for the customer to the aggregated financial information for a subset of the plurality of customers having similar demographic information as demographic information for the customer; and preparing, by the provider computing system, a social benchmarking report for the customer based on the comparison.

10. A system comprising:

a network interface configured to communicate, via a network, with a customer device associated with a customer; and a processing circuit comprising a memory and at least one processor, the memory storing instructions that are executable by the at least one processor to:

receive, from the customer device, a request from the customer to open a subscription account;

create the subscription account for the customer;

request a subscription account preference from the customer, comprising generating a subscription account preference request displayed via a user interface on a device associated with the customer, wherein the subscription account preference comprises at least one topic of interest to the customer;

receive the subscription account preference of the customer, the subscription account preference based on an input of the customer via the user interface;

determine a customized budget for the customer, wherein the customized budget allocates acceptable spending trends to a plurality of categories, and wherein categories associated with the at least one topic of interest identified by the subscription account preference receive a larger spending trend allocation;

deduct a subscription fee from the subscription account;

determine a benefit for the customer, wherein the benefit is offered by a third-party vendor in exchange for a benefit fee, and wherein the determined benefit is based on the received subscription account preference and does not apply to future periods;

reimburse the subscription account for the customer by an amount corresponding to the benefit fee;

notify the customer that the customer does not need to pay the benefit fee for future periods;

aggregate benefit fees for a future period for a plurality of customers including the customer;

pay the aggregated benefit fees;

gather financial information associated with the customer;

analyze the financial information to identify positive financial behavior of the customer, wherein analysis comprises a verification that spending trends of the customer comport with the determined customized budget of the customer;

invoke, via the user interface, a graphical depiction executable, wherein the graphical depiction comprises a chart generated by the system;

determine that the positive financial behavior meets a threshold; and offer the customer a reward based on the positive financial behavior meeting the threshold and based on the received subscription account preference.

11. The system of claim 10, wherein the aggregated benefit fees for the plurality of customers include a negotiated discount with the third-party vendor.

12. The system of claim 10, wherein the instructions are further executable by the at least one processor to prompt the customer to select a subscription tier for the subscription account, wherein the subscription fee is associated with the selected subscription tier.

13. The system of claim 12, wherein the benefit is associated with the selected subscription tier.

14. The system of claim 10, wherein the instructions are further executable by the at least one processor to:

interface with a vendor computing system associated with the third-party vendor; and determine, based on the interfacing, that the customer already has an account with the third-party vendor associated with the benefit.

15. The system of claim 10, wherein the instructions are executable by the at least one processor to determine the benefit for the customer by at least one of:

analyzing a financial history associated with the customer to identify whether the customer has paid for the benefit in the past; or analyzing demographic information associated with the customer to identify the benefit as being selected by other customers holding subscription accounts that are similar to the customer.

16. The system of claim 10, wherein the instructions are further executable by the at least one processor to:

analyze the financial information to determine spending patterns for the customer;

determine one or more recommended spending limits for the customer based on the spending patterns; and set a budget for the customer including one or more confirmed spending limits.

17. The system of claim 16, wherein the instructions are further executable by the at least one processor to:

monitor the customer's spending; and notify the customer of the customer's spending relative to at least one of the one or more confirmed spending limits.

18. The system of claim 10, wherein the instructions are further executable by the at least one processor to:

gather financial information and demographic information from a plurality of customers holding subscription accounts;

aggregate the financial information for the plurality of customers based on the demographic information for the plurality of customers;

compare financial information for the customer to the aggregated financial information for a subset of the plurality of customers having similar demographic information as demographic information for the customer; and prepare a social benchmarking report for the customer based on the comparison.

19. A method comprising:

receiving, by a provider computing system, a request from a customer to open a subscription account;

creating, by the provider computing system, the subscription account for the customer;

requesting, by the provider computing system, a subscription account preference from the customer, comprising generating a subscription account preference request displayed via a user interface on a device associated with the customer, wherein the subscription account preference comprises at least one topic of interest to the customer;

receiving, by the provider computing system, the subscription account preference of the customer, the subscription account preference based on an input of the customer via the user interface;

determining, by the provider computing system, a customized budget for the customer, wherein the customized budget allocates acceptable spending trends to a plurality of categories, and wherein categories associated with the at least one topic of interest identified by the subscription account preference receive a larger spending trend allocation;

deducting, by the provider computing system, a subscription fee from the subscription account;

determining, by the provider computing system, a benefit for the customer, wherein the benefit is offered by a third-party vendor in exchange for a benefit fee, wherein the determined benefit is based on the received subscription account preference and does not apply to future periods, and wherein determining the benefit for the customer comprises:

interfacing, by the provider computing system, with a vendor computing system associated with the third-party vendor; and determining, by the provider computing system, based on the interfacing, that the customer already has an account with the third-party vendor associated with the benefit;

reimbursing, by the provider computing system, the subscription account for the customer by an amount corresponding to the benefit fee;

notifying, by the provider computing system, the customer that the customer does not need to pay the benefit fee for future periods;

aggregating, by the provider computing system, benefit fees for a future period for a plurality of customers including the customer;

paying, by the provider computing system, the aggregated benefit fees;

gathering, by the provider computing system, financial information associated with the customer;

analyzing, by the provider computing system, the financial information to identify positive financial behavior of the customer, wherein analysis comprises a verification that spending trends of the customer comport with the determined customized budget of the customer;

invoking, by the provider computing system and via the user interface, a graphical depiction executable, wherein the graphical depiction comprises a chart generated by the provider computing system;

determining, by the provider computing system, that the positive financial behavior meets a threshold; and offering, by the provider computing system, the customer a reward based on the positive financial behavior meeting the threshold and based on the received subscription account preference.

20. The method of claim 19, wherein the aggregated benefit fees for the plurality of customers includes a negotiated discount with the third-party vendor.

21. The method of claim 19, further comprising prompting, by the provider computing system, the customer to select a subscription tier for the subscription account, wherein the subscription fee is associated with the selected subscription tier.

22. The method of claim 21, wherein the benefit is associated with the selected subscription tier.

23. The method of claim 19, wherein determining the benefit for the customer further comprises at least one of:

analyzing, by the provider computing system, a financial history associated with the customer to identify whether the customer has paid for the benefit in the past; or analyzing, by the provider computing system, demographic information associated with the customer to identify the benefit as being selected by other customers holding subscription accounts that are similar to the customer.

* * * * *